US005784066A

United States Patent [19]
Aizikowitz et al.

[11] Patent Number: 5,784,066
[45] Date of Patent: Jul. 21, 1998

[54] METHOD AND APPARATUS FOR USING PARTNER INFORMATION TO COLOR NODES IN AN INTERFERENCE GRAPH WITHIN A COMPUTER SYSTEM

[75] Inventors: Nava Arela Aizikowitz, Haifa, Israel; Edward Curtis Prosser; Robert Ralph Roediger, both of Rochester, Minn.

[73] Assignee: International Business Machines Corporation, Armonk, N.Y.

[21] Appl. No.: 562,139

[22] Filed: Nov. 22, 1995

[51] Int. Cl.$^6$ .................................................. G06F 15/00
[52] U.S. Cl. .................................................. 345/440
[58] Field of Search ........................... 395/131, 135, 395/140, 141; 345/435, 431, 440, 441

[56] References Cited

U.S. PATENT DOCUMENTS

| | | | |
|---|---|---|---|
| 4,571,678 | 2/1986 | Chaitlin et al. | 364/300 |
| 5,249,295 | 9/1993 | Briggs et al. | 395/650 |
| 5,341,466 | 8/1994 | Perlin et al. | 395/139 |

OTHER PUBLICATIONS

Peter E. Bergner, Peter J. Dahl, and Matthew T. O'Keefe, *Spill Code Minimization Techniques for Graph Coloring Register Allocators*, University of Minnesota Manuscript, Department of Electrical Engineering, 1995.

Preston Briggs, *Register Allocation via Graph Coloring*, PhD Thesis, Rice University, 1992.

Preston Briggs, Keith D. Copper, and Linda Torczon, *Coloring Register Pairs*, ACM Letters on Programming Languages and Systems, ACM Press, vol. 1, No. 1, Mar. 1992, pp. 3–13.

David Callahan & Brian Koblenz, "*Register Allocation via Hierarchical Graph Coloring*", Proceedings of the ACM SIGPLAN '91 Conference on Programming Language Design and Implementation, SIGPLAN Notices, vol. 26, No. 6, pp. 192–203 (Jun. 1991).

Fred C. Chow & John L. Hennessy, "*The Priority–Based Coloring Approach to Register Allocation*", ACM Transaction on Programming Languages and Systems, vol. 12, No. 4, pp. 501–536 (Oct. 1990).

David Bernstein, Dina Goldin, Martin Golumbic, Hugo Krawczyk, Yishay Mansour, Itai Nahshon and Ron Pinter, *Spill Code Minimization Techniques for Optimizing Compilers*, ACM SIGPLAN, Conference on Programming Languages Design and Implementation, 1989.

Preston Briggs, Keith D. Cooper, Ken Kennedy, and Linda Torczon, *Coloring Heuristics for Register Allocation*, ACM SIGPLAN Conference on Programming Languages Design and Implementation, 1989.

Fred C. Chow & John L. Hennessy, "*Register Allocation by Priority–Based Coloring*", Proceedings of the ACM Symposium on Compiler Construction, pp. 222–232 (Jun. 1984).

Auslander & Hopkins, *An Overview of the PL.8 Compiler*, ACM SIGPLAN Notices, vol. 17, No. 6, Jun. 1982.

Gregory J. Chaitin, "*Register Allocation & Spilling via Graph Coloring*", Proceedings of the ACM Symposium on Compiler Construction, pp. 98–105 (Jun. 1982).

Gregory J. Chaitin, Marc A. Auslander, Ashok E. Chandra, John Cocke, Martin E. Hopkins and Peter W. Markstein, *Register Allocation via Coloring*, Computer Languages, 6:47–57, 1981.

*Primary Examiner*—Phu K. Nguyen
*Attorney, Agent, or Firm*—Martin & Associates, L.L.C.; Derek P. Martin

[57] ABSTRACT

A method and apparatus for coloring an interference graph eliminates register copy instructions in an instruction stream by taking into consideration the colors of a node's direct or transitive partners when choosing a color for a node. By assigning a color to a node that is also the color of a direct or transitive partner, register copy instructions between the two partners may be eliminated. If more than one of the partners at any given level are colored, one of the colors may be selected over the others using an appropriate heuristic, such as a scheme that weights the colors appropriately.

59 Claims, 12 Drawing Sheets

```
/* Some Code */ load     R87 = 1
L1:
        mult     R90 = R87, 10
        add      R92 = R87, 10
        mult     R93 = R90, R92
        call     "A" (R93)
        add      R87 = R87, 1
        compare  R87, 100
        b.lt     L1

/* More Code */
```

METHOD AND APPARATUS FOR USING PARTNER INFORMATION TO COLOR NODES IN AN INTERFERENCE GRAPH WITHIN A COMPUTER SYSTEM

RELATED APPLICATIONS

This patent application is related to the following co-pending patent applications: "Method and Apparatus for Improving Colorability of Constrained Nodes in an Interference Graph Within a Computer System", Ser. No. 08/509,637, filed Jul. 31, 1995; and "Register Allocation Method and Apparatus for Truncating Runaway Lifetimes of Program Variables in a Computer System", Ser. No. 08/522,052, filed Aug. 31, 1995; both of which are incorporated herein by reference.

FIELD OF THE INVENTION

This invention generally relates to computer systems. More specifically, this invention relates to a method and apparatus for coloring an interference graph within a computer system.

BACKGROUND OF THE INVENTION

Graphs have been commonly used for centuries to model a variety of physical and mathematical relationships, and are often useful in solving problems that arise from these relationships. One problem that may be solved using a graph is determining how to allocate a large number of items to a smaller number of available resources (e.g., register allocation methods used in an optimizing compiler). One common method of graphically representing the relationship between the items and the resources uses an interference graph.

An interference graph is a tool which may be used to assign a limited number of resources to a large number of items that each need one of the resources. One example of an interference graph is shown in FIG. 4. Each item that requires a resource is represented by a "node", drawn on the interference graph of FIG. 4 as a circle, such as nodes A, B, C, D and E. If two items require a resource at the same time, the items are said to "interfere" with each other. The interference between two items (i.e., nodes) is represented on the interference graph by connecting the two nodes that interfere with a line or "edge", such as the edge connecting nodes A and B in FIG. 4. Once the interference graph is complete, all the items that require a resource are nodes in the graph, and the edges of the graph show the interferences between these items. Now the task remains to assign the limited number of resources to the large number of nodes in the interference graph.

The nodes in an interference graph may be assigned to a smaller number of resources using a technique known as "graph coloring." Each resource is assigned a different color. A selected node on the interference graph may be colored with any color that is not used by one of its immediate neighbors (i.e., nodes connected to the selected node with an edge). This coloring scheme works because the edge represents an interference between nodes, which means that the nodes have a conflicting need for a resource. Since a resource (color) cannot service two items (nodes) that have conflicting needs, a color cannot be assigned to two nodes connected with an edge (i.e., neighbors). The large number of items may be successfully allocated to the smaller number of resources provided that each node in the interference graph may be colored with a color different from all its neighbors. If each node in the interference graph may be assigned a color subject to these constraints, the graph is "colorable."

Some interference graphs may not be colorable due to the number and/or arrangement of interferences between the nodes. If a node has a number of incident edges equal to or greater than the number of available colors, the node is "constrained", and may not be colored if all the available colors are used by its neighbors. If a node has fewer incident edges than available colors, the node is "unconstrained", since there is at least one color left which may be assigned to the node. An interference graph with all unconstrained nodes is inherently colorable. However, an interference graph that has one or more constrained nodes may or may not be colorable. If the graph is not colorable, the number of resources corresponding to colors cannot adequately service the number of items needing service, without modification of the system (e.g., reducing the need for resources). If the graph is colorable, the number of resources (colors) is adequate for the items (nodes). However, the fact that a graph is colorable only means that all the nodes in the interference graph may be colored if the colors are appropriately selected; whether or not a colorable graph with constrained nodes is successfully colored depends on the method for selecting a color for each node.

The coloring method determines the likelihood of coloring constrained nodes in an interference graph. For example, if ten colors (resources) are available, and a given node has three neighbors that have all been assigned unique colors, any of the remaining seven colors may be assigned to the node. However, a random or arbitrary selection of one of the seven available colors may result in constrained nodes that cannot be colored.

One known color selection scheme prioritizes the colors and assigns the highest priority color possible to each node. For example, if no neighbors have been colored, the highest priority color is assigned to the node. If the two highest priority colors are used by neighbors, the third color is assigned to the node, and so on. This color selection scheme succeeds in coloring more nodes than would result from using an arbitrary color selection scheme. However, even this prioritized coloring may not select the best color for the node.

The known methods of coloring an interference graph often do not succeed in choosing the best color for a node. Thus, the benefit of using an interference graph is limited by the coloring scheme used. Without improved methods of coloring, the ability to allocate limited resources using an interference graph will be impaired.

SUMMARY OF THE INVENTION

According to the present invention, a method and apparatus for coloring an interference graph selects a color for a node by using information about the colors of the partners of the node to be colored. A first embodiment in accordance with the present invention counts the number of register copies between the symbolic register represented by that node and each of its colored partners. The color for each colored partners is then weighted according to the number of register copies, and the color is selected that has the greatest weight.

A second embodiment in accordance with the present invention uses the concept of transitive partners. If a node's partners (at the first level) are all uncolored, the coloring mechanism then looks to the partners' partners to see if any of the partners at the second level are colored. The coloring mechanism may go however many levels deep as needed, but with each deeper level, the advantage and practical significance of selecting a color found at that level decrease.

The concept of transitive partners in accordance with the second embodiment may be extended to include a weighted count, as described in the first embodiment for direct partners. This weighting scheme may be a simple weighting scheme, which assigns a value to the color that corresponds to the number of register copies for that color. More sophisticated weighting schemes may also be used, such as weighting each register copy according to its loop depth to arrive at an overall weight.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DESCRIPTION OF THE PREFERRED EMBODIMENTS

OVERVIEW

Figure 1:
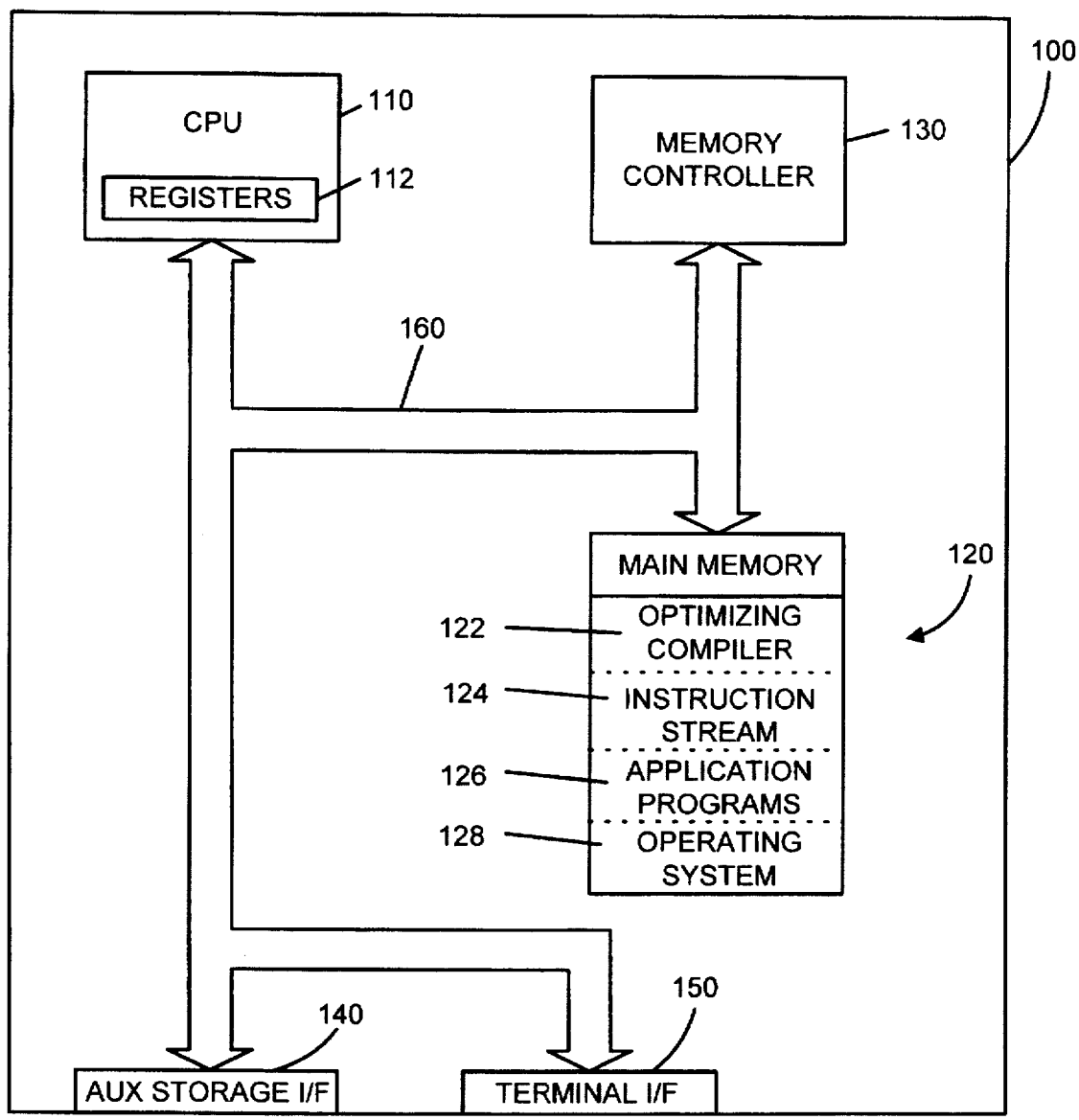
FIG. 1 is a schematic block diagram of a computer system in accordance with the present invention.

The method and apparatus of the present invention, while applicable to the coloring of any interference graph for any purpose, has particular applicability to the field of compilers, and specifically to the register allocation methods used in optimizing compilers. For those individuals who are not compiler experts, a brief overview of compilers and various register allocation mechanisms used in compilers is presented here.

Statements, Instructions, Compilers

Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. The programmer then uses mechanisms that change the human readable form of the computer program into a form that can be understood by a computer system (called machine readable form, or object code). These mechanisms are typically called compilers; however, it should be understood that the term "compiler", as used within this specification, generically refers to any mechanism that transforms one representation of a computer program into another representation of that program.

This machine readable form, within this specification, is a stream of binary instructions (i.e., ones and zeros) that are meaningful to the computer. The compiler typically compiles each human readable statement into one or more machine readable instructions. Compilers generally translate each human readable statement in the source code instruction stream into one or more intermediate language instructions, which are then converted into corresponding machine-readable instructions. Special compilers, called optimizing compilers, typically operate on the intermediate language instruction stream to make it perform better (e.g., by eliminating unneeded instructions, etc.). Some optimizing compilers are wholly separate while others are built into a primary compiler (i.e., the compiler that converts the human readable statements into machine readable form) to form a multi-pass compiler. In other words, multi-pass compilers first operate to convert source code into an instruction stream in an intermediate language understood only by the compiler (i.e., as a first pass or stage) and then operate on the intermediate language instruction stream to optimize it and convert it into machine readable form (i.e., as a second pass or stage).

A compiler may reside within the memory of the computer which will be used to execute the object code, or may reside on a separate computer system. Compilers that reside on one computer system and are used to generate machine code for other computer systems are typically called "cross compilers." The methods and apparatus discussed herein apply to all types of compilers, including cross compilers.

Physical Registers, Symbolic Registers, Live Ranges

During the first pass or stage, the compiler typically assumes that an unlimited number of physical registers are available for the target central processing unit (CPU) to use. Thus, each time a program variable is encountered, it is assigned a new register in the intermediate language. However, in reality, the CPU typically has a fixed number of registers to use while executing a machine code instruction stream. Since the registers used in the intermediate language instruction stream have no correlation to physical CPU registers, they are known as symbolic registers. During the second pass or stage, the optimizing compiler typically must allocate the large number of symbolic registers to a much smaller number of physical registers available to the CPU. This process, known as register allocation, is one of the principal applications for the method and apparatus of the present invention.

Figure 2:
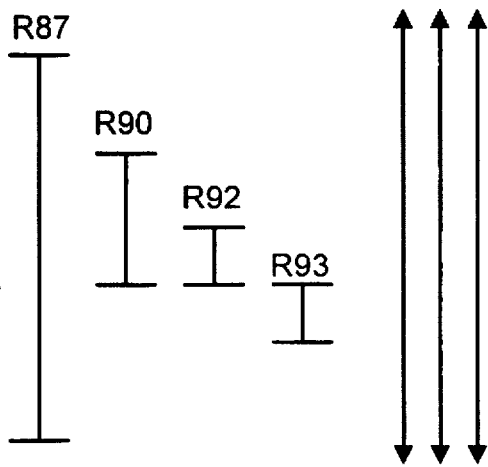
FIG. 2 is an illustration of the live ranges for symbolic registers in a portion of an intermediate language instruction stream.

Register allocation in a compiler typically uses the concept of "live ranges." A "live range" for a variable, which may be a variable from the source program or a temporary variable generated by the compiler, is typically defined by a set of instructions for which the value contained in the symbolic register that represents the variable will be used in a subsequent computation. The live range for a variable begins when the variable is defined, and ends at the last use of the variable that occurs before any other definition of the variable. Note that the definition of live range used herein is simplified for purposes of illustrating the concepts of the present invention. For example, a live range may actually contain multiple definitions and last uses for a variable. Those skilled in the art are familiar with the concept of live ranges, and the simplified definition used herein shall not be construed as limiting the application of the present invention. Referring to FIG. 2, the live ranges for variables R87, R90, R92, and R93 are shown by vertical lines to the right of the instruction stream spanning the number of instructions that make up the live range. Note that various other live ranges are live for the entire loop of FIG. 2. The live range for R90 in FIG. 2 begins when R90 is defined (i.e., mult R90=R87, 10), and ends at the last use of R90 (i.e., mult R93=R90, R92).

Each live range is assigned a unique "name" (e.g., R87, R90, R92, and R93 in FIG. 2), which becomes a node on an interference graph. Two live ranges interfere with each other if they overlap, implying that a single physical register could not be used for both live ranges since they are both live (i.e., contain valid data) at the same time. Referring again to FIG. 2, R87 interferes with (i.e., overlaps) R90, R92, and R93; R90 interferes with R87 and R92; R92 interferes with R87 and R90; and R93 interferes with R87. Note that R87, R90, R92, and R93 also interfere with other live ranges shown to the right of FIG. 2, but these interferences are ignored in this discussion to illustrate register allocation mechanisms for a small exemplary portion of an instruction stream.

Figure 3:
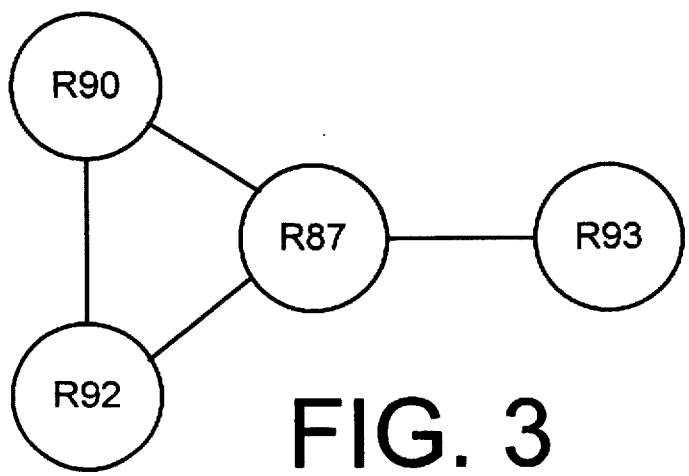
FIG. 3 is an interference graph of the live ranges shown in FIG. 2.

FIG. 3 represents an interference graph for the live ranges of FIG. 2. A check of the edges associated with each node in FIG. 3 shows that the interference information represented in the interference graph in FIG. 3 is equivalent to the interference information represented by the overlapping live ranges in FIG. 2. If all the live ranges of symbolic registers may be allocated to physical CPU registers, the optimizing compiler produces a machine code instruction stream with a minimal number of loads and stores to memory. Loads and stores to memory take considerably longer than operations to registers, and minimizing the number of loads and stores to memory is thus a primary goal of an optimizing compiler in order to minimize the execution time of the machine code instruction stream. If one or more of the symbolic registers cannot be allocated to a CPU register, the live range must be "spilled", meaning that the live range is allocated to a memory location rather than to a register, and therefore must be loaded into a register from memory before use, and must be written back to memory after being changed. If the live range is spilled, spill code must be added to the intermediate language instruction stream to accomplish the required accesses to memory. The loading and storing of spilled live ranges adds overhead to the machine code instruction stream, slowing its execution time, and slows compilation time due to the insertion of spill code. Therefore, an optimizing compiler typically has a goal of efficiently allocating CPU registers to the highest number of symbolic registers possible, in order to minimize the overhead associated with spill code.

Register Allocation Mechanisms for Compilers

Figure 6A:
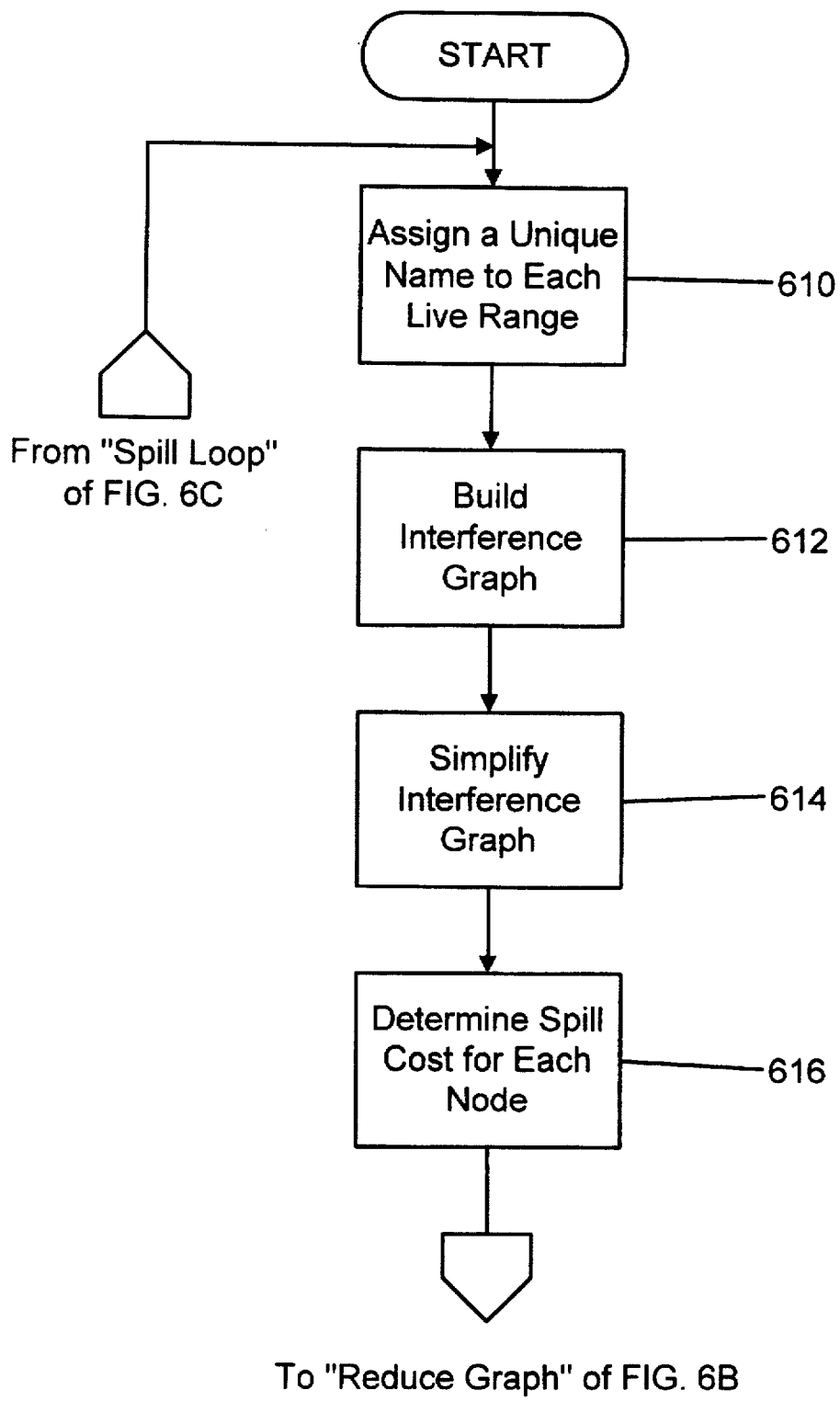
FIGS. 6A–6C are a flow diagram of a method for allocating registers in a compiler using an interference graph.

A well-known mechanism for allocating registers in an optimizing compiler was developed by Gregory J. Chaitin of IBM, as disclosed in U.S. Pat. No. 4,571,678 *"Register Allocation and Spilling Via Graph Coloring"* (issued Feb. 18, 1986 to Chaitin and assigned to IBM); Gregory J. Chaitin et al., *"Register Allocation Via Coloring"*, Computer Languages, Vol. 6, p. 47–57 (1981); and Gregory J. Chaitin, *"Register Allocation& Spilling Via Graph Coloring"*, SIGPLAN '82 Symposium on Compiler Construction, SIGPLAN Notices, Vol. 17, No. 6, p. 98–105 (June 1982). Chaitin's register allocation mechanism is represented by the flow diagram of FIGS. 6A–6C. Chaitin's register allocation mechanism operates on an intermediate language instruction stream, i.e., the instruction stream that results from the first pass or stage of an optimizing compiler. Referring now to FIG. 6A, the first step is to determine the various "live ranges" of the symbolic registers in the intermediate language instruction stream, and to give each live range a unique "name" (step 610). The live ranges of the names are then compared, interferences between names are identified, and an interference graph is constructed (step 612). In the interference graph, each name is represented by a node in the graph, and the interferences are represented by edges between nodes. The interference graph, as described in the Background section above, is defined such that no two nodes connected by an edge may be colored the same color. Once the interference graph is constructed, it may be simplified (step 614). One suitable simplification process is known as coalescing, which combines two names into a single name where appropriate. Chaitin then computes the predicted expense of spilling ("spill cost") for each node in the interference graph (step 616). With the completed interference graph and associated spill costs for each node, the interferences in the graph may now be analyzed.

Figure 6B:
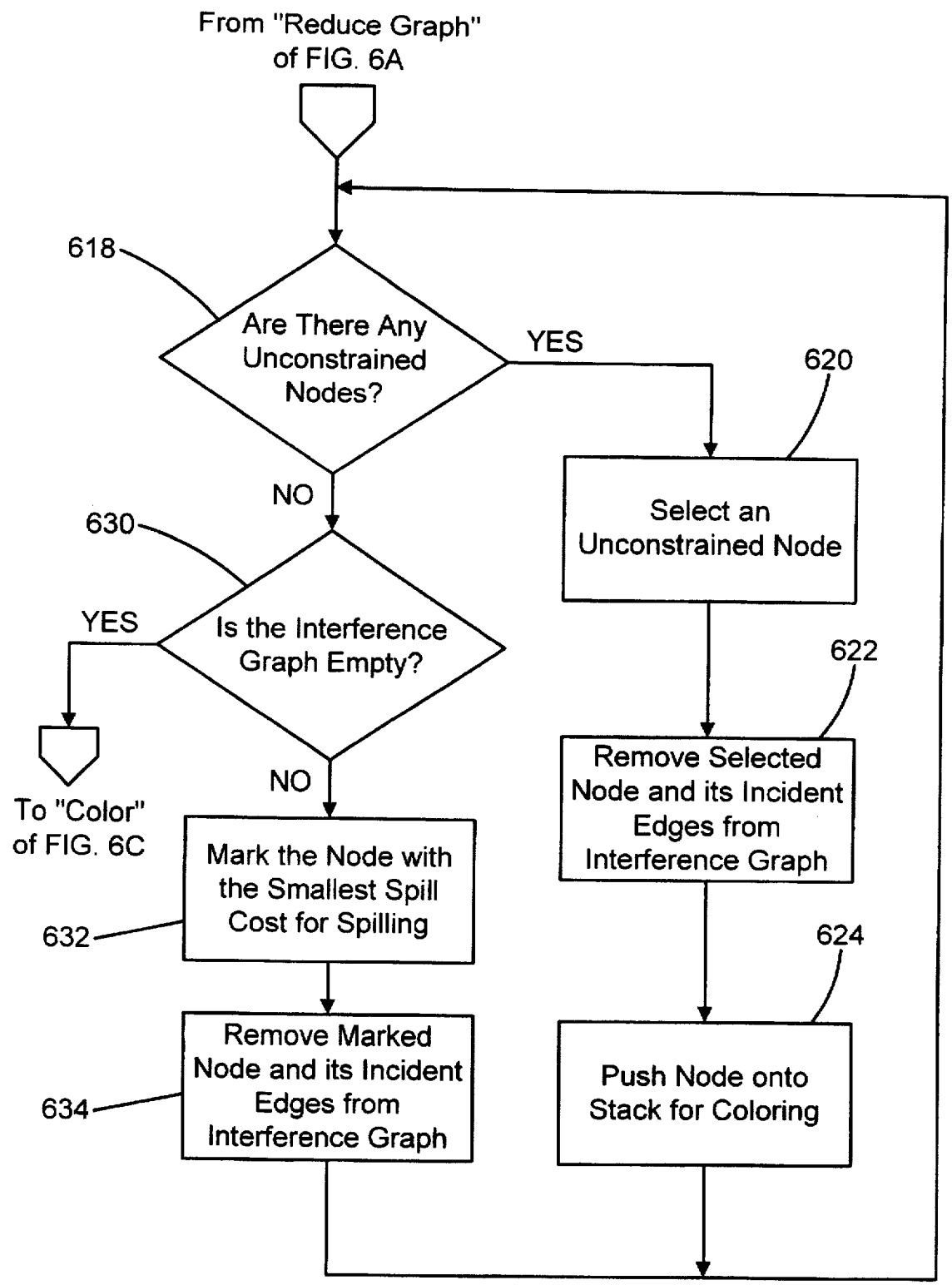

Now that the interference graph has been built, it may be used as a tool to allocate physical registers to names (i.e., live ranges). Referring now to FIG. 6B, Chaitin analyzes the interference graph by first checking to see if there are any unconstrained nodes (step 618), i.e., a node that has a degree (or number of incident edges) less than the number of colors. If there are one or more unconstrained nodes, one of the unconstrained nodes is arbitrarily selected (step 620). The selected node and its incident edges are removed from the interference graph (step 622), and the node is then pushed onto the stack (step 624) for coloring. This process of removing unconstrained nodes (comprising steps 620, 622 and 624) continues until there are no more unconstrained nodes in the interference graph. When no more unconstrained nodes are present in the graph (step 618=NO), Chaitin looks to see if the graph is empty (step 630). If the graph is empty without designating any nodes for spilling, the graph is colorable, and Chaitin will succeed in allocating a color to each node in the interference graph.

If the graph is not empty (step 630=NO), then there remain in the interference graph only constrained nodes (i.e., nodes that have a degree greater than or equal to the number of colors). Chaitin marks one of the remaining nodes having the smallest spill cost for spilling (step 632), and removes the marked node and its incident edges from the graph (step 634). Chaitin calculates spill cost as a function of the number of instructions referring to the symbolic register, the nesting level, and the degree of the node, but many other heuristics may be used to determine which of the remaining constrained nodes are to be spilled. Note that the removal of the node to be spilled and its edges may result in one or more of the remaining nodes becoming unconstrained. This process of removing unconstrained nodes from the graph and pushing them on the stack (steps 620, 622, and 624) and/or marking various nodes for spilling and removing them from the graph (steps 632 and 634) continues until the graph is empty (step 630=YES).

Figure 6C:
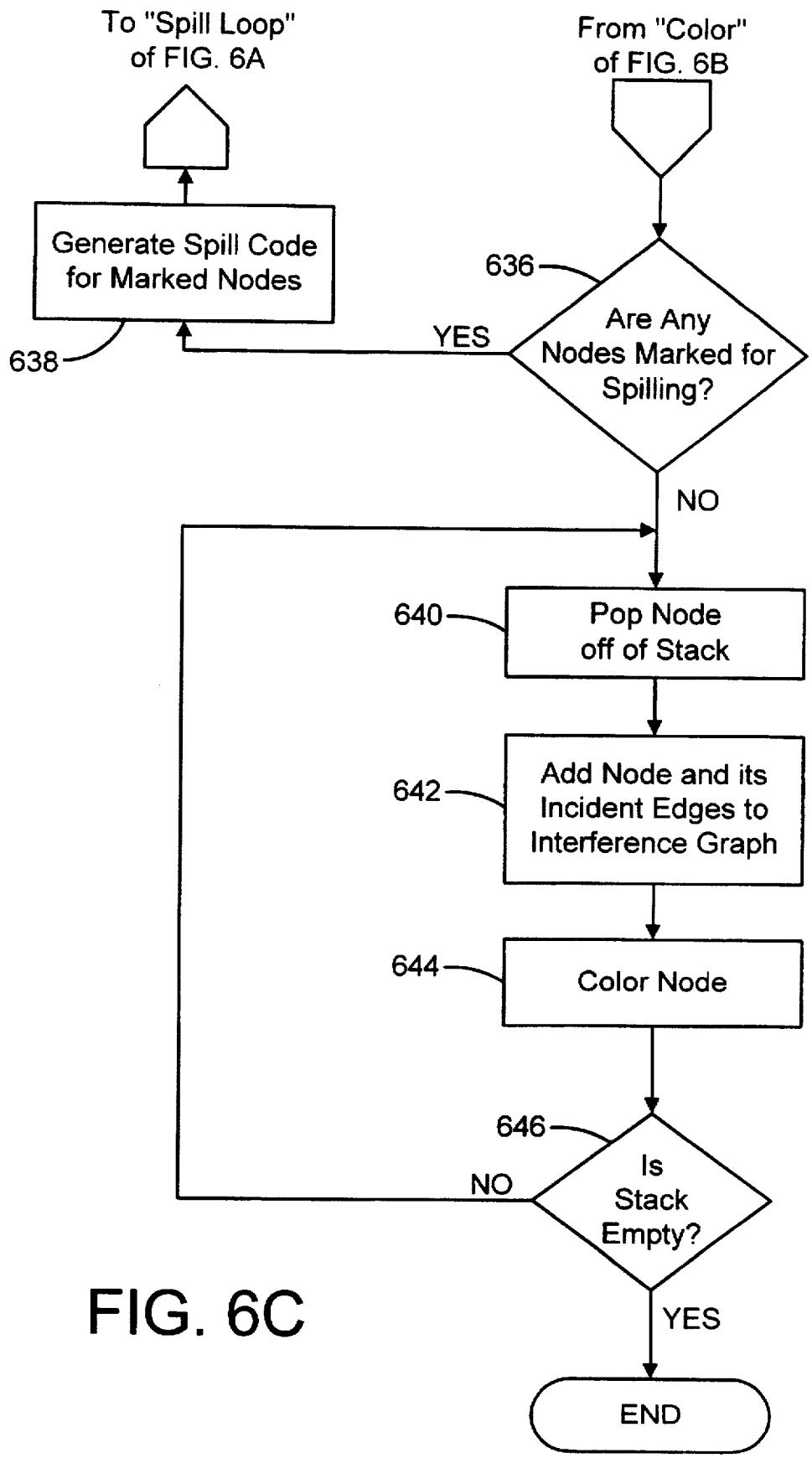

Referring to FIG. 6C, Chaitin next checks to see if any nodes were marked for spilling (step 636). If any nodes were marked for spilling, spill code is generated (step 638), and Chaitin loops back to the beginning of the process to re-build the interference graph to include the live ranges of the newly generated spill code. If no spill code was generated (step 636=NO), the graph is colorable, and one by one the nodes are popped off the stack (step 640), put back into the interference graph with their incident edges (step 642), and assigned a color (step 644), until the stack is empty (step 646=YES). The interference graph that results is fully colored. The compiler then assigns a physical CPU register to each color, and transforms the intermediate language instruction stream into the machine code instruction stream. With a fully colored graph, the compiler may thus assign every name (i.e., live range) to a physical CPU register, making the generation of additional spill code unnecessary.

Figure 4:
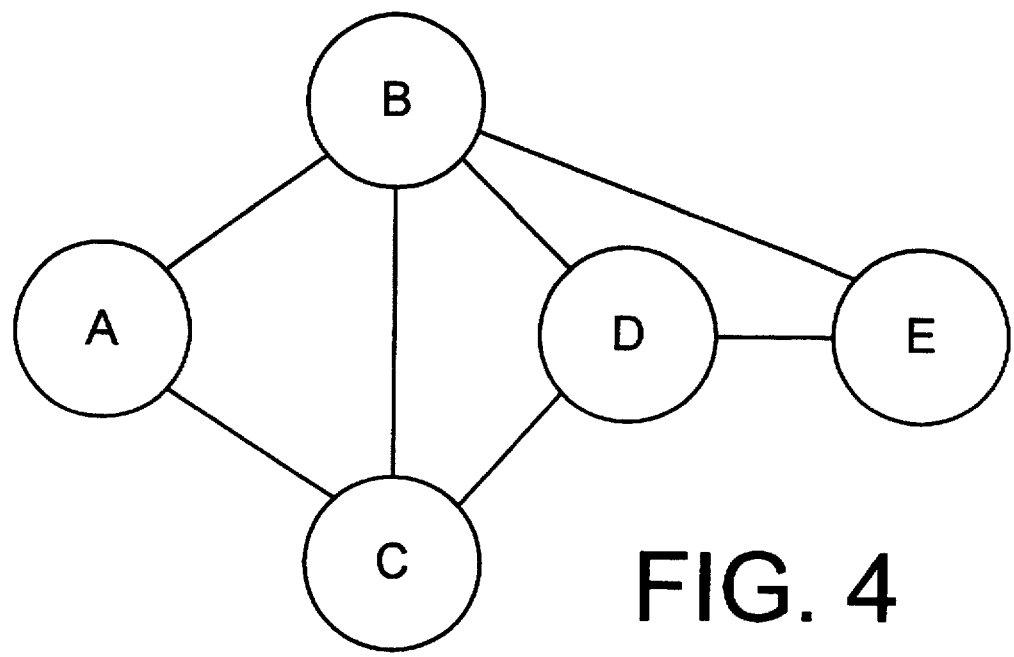
FIG. 4 is an interference graph that has five nodes and seven edges.

An example of the Chaitin coloring approach may be shown in reference to the interference graph of FIG. 4. This graph assumes that steps 610, 612, 614 and 616 of FIG. 6A have already been performed. Assuming a three-coloring of the graph is desired, initially nodes A and E are unconstrained (i.e., have less than three edges), while nodes B, C and D are constrained (i.e., have three or more edges). Referring to FIG. 6B, using Chaitin's approach, either of nodes A or E may be initially removed from the interference graph (step 618). We will arbitrarily choose node A (step 620), remove node A and its incident edges from the graph (step 622), and push node A onto the stack (step 624). With A and its incident edges removed, node C becomes unconstrained, node E remains unconstrained, and nodes B and D remain constrained. Arbitrarily choosing node C for removal (step 620), node C and its incident edges are removed from the graph (step 622), and node C is pushed onto the stack (step 624). As a result, node E remains unconstrained, and nodes B and D both become unconstrained. With all the remaining nodes (i.e., B, D, & E) unconstrained, we can arbitrarily choose the order of their removal (step 620), which we assume here is in the order B, D and E, and these nodes are removed from the graph (step 622) and pushed onto the stack (step 624). At this point the graph is empty (step 630=YES), and no constrained nodes were marked for spilling (step 636=NO), so the graph may be reconstructed and colors assigned by popping the nodes off the stack. The stack now has the following nodes, from bottom to top: A, C, B, D, E. Let's assume the three colors for this graph are red, green and blue. The first node off the stack is node E (step 640), which is put back into the interference graph with its incident edges (step 642), and assigned any one of the three colors. We arbitrarily choose red for node E (step 644). At this point the stack is not empty (step 646=NO), so the process continues for the next node. Node D is then popped off the stack (step 640) and added back into the interference graph with its incident edges (step 642). Node D may not be colored red, since its neighbor E is colored red, but may be colored either green or blue. We arbitrarily choose green for node D (step 644). Node B is then popped off the stack (step 640) and added back into the interference graph with its incident edges (step 642). Node B may not be colored red since its neighbor E is colored red, and may not be colored green since its neighbor D is colored green. Thus, B must be colored blue (step 644). Node C is then popped off the stack (step 640), and added back into the interference graph with its incident edges (step 642). Node C must be colored red (step 644) since node B is colored blue and node D is colored green. Node A is then popped off the stack (step 640) and added back into the interference graph with its incident edges (step 642). Node A must be colored green (step 644) since node B is colored blue and node C is colored red. This completes the coloring of the interference graph of FIG. 4, successfully assigning the three available colors to the five nodes, with A green, B blue, C red, D green, and E red.

Figure 5:
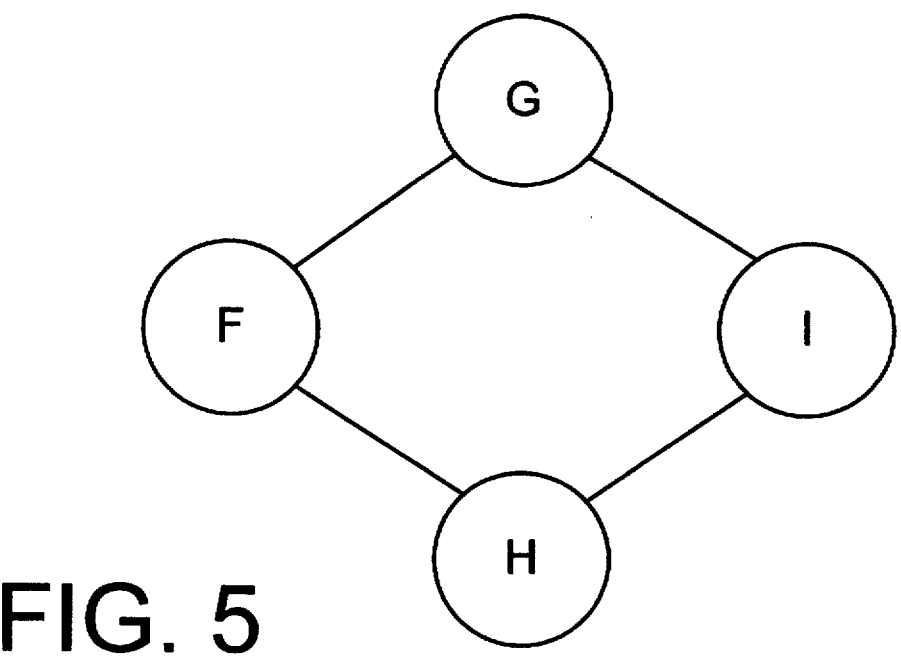
FIG. 5 is an interference graph that has four nodes and four edges.

The Chaitin approach works well in many circumstances, but may generate unnecessary spill code for graphs that are colorable. A simple example which illustrates the shortcomings of Chaitin is shown in FIG. 5. Assuming a two coloring of the graph is desired (red and blue), all the nodes are initially constrained, since the degree of each is two. According to Chaitin's approach, the node with the smallest spill cost will be marked for spilling and removed from the interference graph with its incident edges (steps 632 and 634). We select node F, assuming that node F has the smallest spill cost (or, in the alternative, that the spill costs are equal and node F is arbitrarily chosen). As a result of marking node F for spilling and removing node F and its incident edges from the interference graph, nodes G and H become unconstrained. If we arbitrarily select node G, push node G onto the stack, and remove node G and its incident edges from the interference graph, nodes H and I remain, both of which are now unconstrained. We arbitrarily choose node I, followed by node H. At this point the graph is empty (step 630=YES), so we test to see if any nodes were marked for spilling (step 636). In this case, node F was marked for spilling, so spill code is generated for node F (step 638), and the process will have to be repeated to assure a coloring of the live ranges in the new spill code. Note, however, that spilling node F is unnecessary. It would be possible, for example, to color nodes G and H red and nodes F and I blue, resulting in a full coloring of the interference graph of FIG. 5.

This shortcoming of Chaitin was addressed in Preston Briggs et al., *"Coloring Heuristics for Register Allocation"*, Proceedings of the SIGPLAN '89 Conference on Programming Language Design and Implementation, ACM Press, Vol. 24, No. 7, p. 275-284 (July 1989). Briggs suggested a more "optimistic" coloring approach. If an interference graph has only constrained nodes left, Briggs pushes one of the constrained nodes onto the stack, hoping later to be able to color it. In the case of the interference graph of FIG. 5, Briggs might select node F to push onto the stack, even though it is constrained. By removing node F, nodes G and H become unconstrained, and all the remaining nodes may be removed and pushed onto the stack. Assume the stack has the following order of nodes (bottom to top): F, G, I, H. Briggs pops node H off the stack, adds it back into the interference graph with its incident edges, and assigns it a color (e.g., red). Node I is then popped off the stack, added to the graph, and colored blue. Node G is then popped off the stack, added to the graph, and colored red. Node F is then popped off the stack, added to the graph, and colored blue. Briggs thus obtains a successful two coloring of the interference graph of FIG. 5 even though Chaitin failed to do so.

Note that the Briggs approach will color a graph (e.g., FIG. 4) that may be reduced to the empty graph by removing unconstrained nodes in the same manner as the Chaitin coloring approach. The primary difference in Briggs appears when only constrained nodes remain in the interference graph. Chaitin pessimistically marks a node for spilling, while Briggs optimistically pushes a constrained node onto the stack, hoping to be able to color it later. Briggs thus potentially colors more nodes than is possible using Chaitin's approach.

Partners

A concept of "partnership" between symbolic registers may be used to simplify an instruction stream by intelligently selecting colors based on partner information during the coloring process. Two live ranges (or names) are "partners" if there is a load from one to the other (i.e., a register copy) in the intermediate language instruction stream. If both of these nodes representing the two live ranges may be colored the same color, the same physical register would be used for both variables, thereby eliminating the register copy instruction and further simplifying the resultant instruction stream, which reduces the run-time of the resultant machine code instruction stream.

Two types of partners are discussed herein. The direct partners of a selected node (or name) are those nodes representing names to/from which a copy is performed from/to the selected node. Transitive partners, on the other hand, are not direct partners, but have a partnership link to a common node. A partnership link is a path of partnerships interconnecting two nodes that may pass through intermediate partner nodes. The simplest example of transitive partners is a node and one of its partner's partners. This concept of transitive partners may extend many levels deep, but the value of the color of transitive partners decreases as the depth increases.

Preston Briggs acknowledged the value of using partner information by suggested a method of "biased coloring", which chooses a color for a node that is also the color of one of the node's partners. Preston Briggs, *Register Allocation via Graph Coloring*, PhD Thesis, p. 50, Rice University, 1992. Briggs suggested the biased coloring scheme as an improvement to traditional coalescing. Biased coloring and coalescing are two different ways to handle symbolic registers with overlapping or adjoining lifetimes or live ranges. The step of coalescing typically comes after the graph is constructed and before the coloring step. Coalescing is a process of combining two nodes into one, with the resultant node having all the constraints of both nodes. As a result, coalescing typically yields nodes that have more constraints. Thus, coalescing may create nodes that must be spilled or that have a higher likelihood of being spilled due to the higher number of constraints. In addition, coalescing takes a significant amount of compiler time, since the interference graph must be rebuilt after coalescing is completed.

The biased coloring scheme that Briggs proposed defers the decision to combine live ranges until the coloring stage, rather than coalescing nodes before coloring. By appropriately biasing the color selection to choose colors of partners of uncolored partners, names with overlapping or adjoining lifetimes may be combined, thereby eliminating register copy instructions in the intermediate code instruction stream. By providing a biased coloring scheme according to the Briggs approach, a compiler may perform a more limited coalesce before graph coloring, since many of the nodes will be effectively "coalesced" later by the biased coloring scheme during graph coloring. One example of a limited coalesce is to coalesce only those nodes that have identical constraints. The additional time a compiler spends on the biased coloring is much less than the time saved by limiting the scope of the coalesce stage of the compiler, resulting in faster compile time and faster execution time of the run-time code (i.e., machine code instruction stream).

While Briggs provides for biasing the coloring of an interference graph according to the color of a node's partners, it has several shortcomings. For example, if there are several partners that are colored, the Briggs biased coloring approach does not provide any rationale or guidance for selecting one of the partner colors above another. In addition, if none of the partners are colored, the biased coloring scheme of Briggs does not apply, and is thus incapable of providing any meaningful information (or biasing) regarding an appropriate color selection.

Mechanisms of the Present Invention

The Chaitin method of allocating registers in an optimizing compiler as represented in detail in FIG. 6 shows the entire process of allocating physical registers to symbolic live ranges in an optimizing compiler. Note, however, that the mechanism of the present invention relates specifically to step 644, during which a selected node is colored. While the specific register allocation mechanism of both Chaitin and Briggs are discussed herein, these discussions provide a context for understanding the usefulness of the mechanisms of the present invention, and should not be construed as limiting. In fact, the coloring mechanism of the present invention is applicable to any type of generic problem that may be solved by the coloring of an interference graph.

As discussed above, the mechanisms of the present invention use partner information in selecting the color for each node in an interference graph. The partner information may be used in any of a variety of ways to determine the best color depending on a number of different factors, selectable by the user by appropriately operating upon the color information according to a desired heuristic. The various embodiments herein disclose apparatus and methods to select a color based on the colors of a node's partners, or based on the colors of partners of the node's uncolored partners, going farther down in levels of transitive partners as needed. According to the rules of the interference graph, the methods disclosed herein may only select a color if it is available, i.e., not used by one of the node's neighbors. The first embodiment selects an available color that occurs in any of the node's colored partners according to a weighting criteria for the colors of the partners. The second embodiment selects an available color that occurs in one of the node's transitive partners if none of the node's direct partners are colored. A weighting criteria may also be applied to the second embodiment to choose the color from the available colors that has the most desirable weighted value. While the embodiments and features provide good illustrative examples of the benefits and advantages of the present invention, these examples are not limiting, and other methods of coloring not enumerated herein based on the colors of direct partners, transitive partners, or partners of neighbors, whether colored or uncolored, and whether constrained or unconstrained, are clearly within the scope of the present invention.

DETAILED DESCRIPTION

Referring to FIG. 1, a computer system 100 in accordance with the present invention is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. Computer system 100 suitably comprises a CPU 110, main memory 120, a memory controller 130, an auxiliary storage interface 140, and a terminal interface 150, all of which are interconnected via a system bus 160. Note that various modifications, additions, or deletions may be made to the computer system 100 illustrated in FIG. 1 within the scope of the present invention such as the addition of cache memory or other peripheral devices; FIG. 1 is presented to simply illustrate some of the salient features of computer system 100.

CPU 110 performs computation and control functions of computer system 100, and comprises a suitable central processing unit with several internal registers 112. The registers 112 within CPU 110 correspond to the "physical registers" discussed in the Overview section above. The performance of computer system 100 depends on how efficiently CPU 110 uses its registers 112, which depends on the efficiency of the register allocation scheme. Therefore, register allocation is critical to the performance of computer system 100. CPU 110 may comprise a single integrated circuit, such as a microprocessor, or may comprise any suitable number of integrated circuit devices and/or circuit boards working in cooperation to accomplish the functions of a central processing unit. CPU 110 suitably executes an instruction stream 124 within main memory 120, and in response thereto acts upon information in physical registers 112.

Auxiliary storage interface 140 is used to allow computer system 100 to store and retrieve information from auxiliary storage, such as magnetic disk (e.g., hard disks or floppy diskettes) or optical storage devices (e.g., CD-ROM). Memory controller 130, through use of a processor separate from CPU 110, is responsible for moving requested information from main memory 120 and/or through auxiliary storage interface 140 to CPU 110. While for the purposes of explanation, memory controller 130 is shown as a separate entity, those skilled in the art understand that, in practice, portions of the function provided by memory controller 130 may actually reside in the circuitry associated with CPU 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main CPU 110 and a single system bus 160, it should be understood that the present invention applies equally to computer systems having multiple main CPUs and multiple I/O buses. Similarly, although the bus 160 of the preferred embodiment is a typical hardwired, multidrop bus, any connection means that supports bi-directional communication could be used.

Main memory 120 contains optimizing compiler 122, machine code instruction stream 124, application programs 126, and operating system 128. Within compiler 122 is a register allocation mechanism which allocates physical registers 112 within CPU 110 to instructions in machine code instruction stream 124 by coloring nodes in an interference graph according to the present invention. It should be understood that main memory 120 will not necessarily contain all parts of all mechanisms shown. For example, portions of application programs 126 and operating system 128 may be loaded into an instruction cache (not shown) for CPU 110 to execute, while other files may well be stored on magnetic or optical disk storage devices (not shown). In addition, compiler 122 may generate a machine code instruction stream 124 that is intended to be executed on a different computer system if compiler 122 is a cross-compiler.

The remainder of this specification describes how the present invention allocates physical registers 112 to instructions in machine code instruction stream 124. Those skilled in the art will appreciate that the present invention applies equally to any compiler or any instruction stream that may be optimized by representing the relationship between registers on an interference graph. In fact, as discussed above, the present invention relates to any application, whether computer-based or not, where an interference graph is constructed and colored to solve a problem.

Figure 7A:
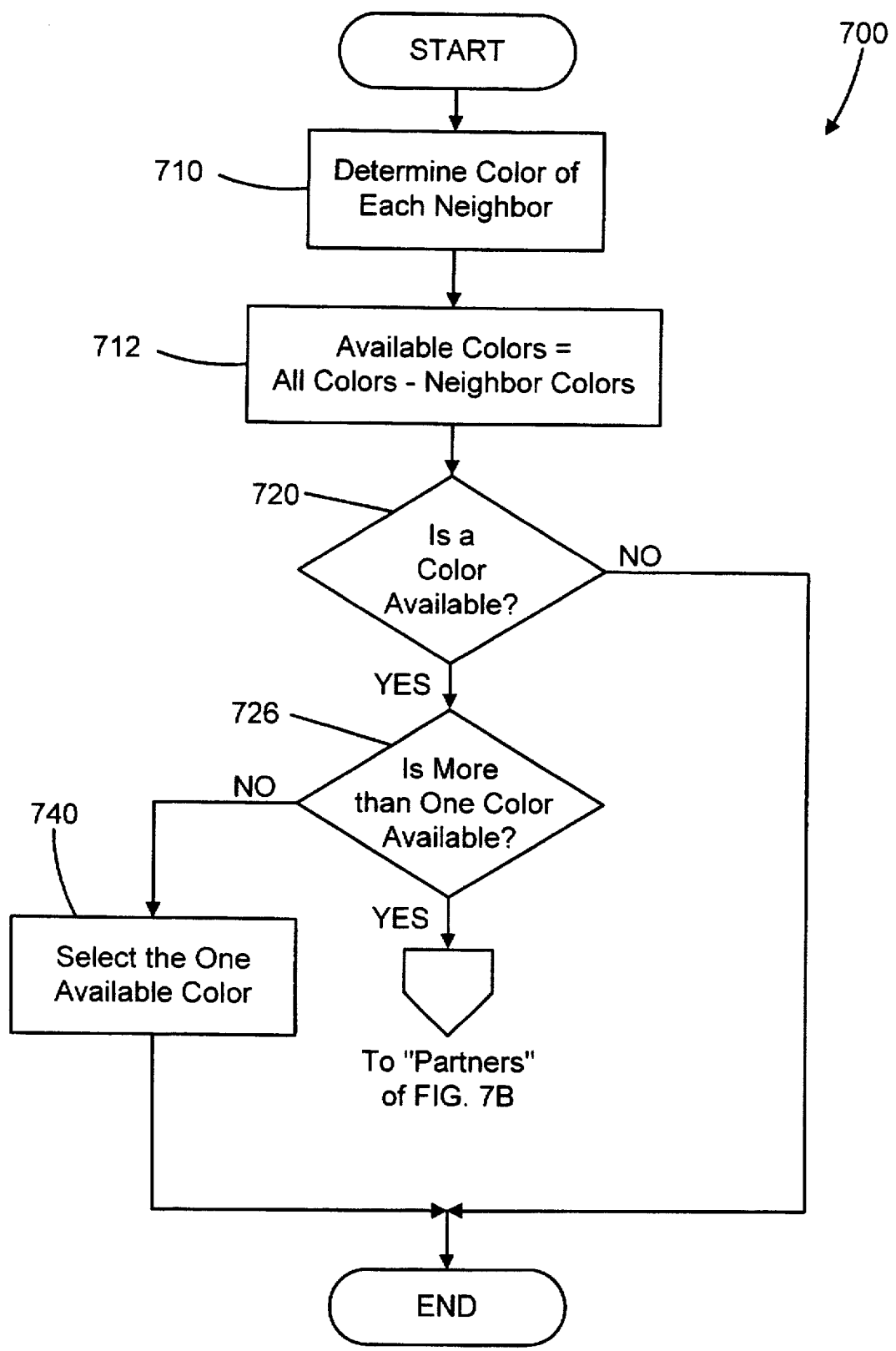
FIGS. 7A–7B are flow diagrams of the color selection method of the present invention.
Figure 7B:
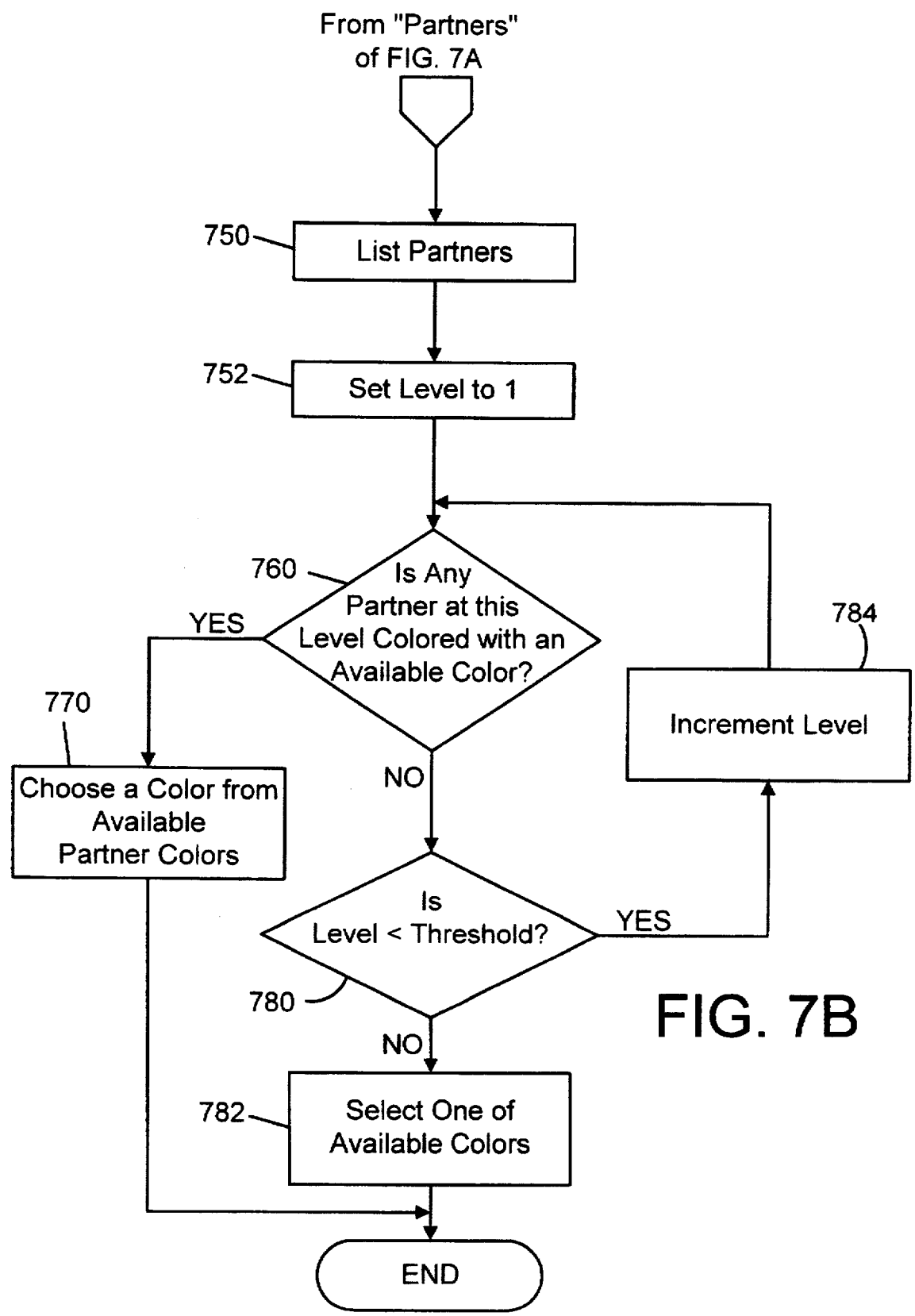

Referring now to FIGS. 7A and 7B, a method 700 of coloring a node in accordance with the present invention suitably comprises step 644 in Chaitin's approach (as illustrated in FIG. 6C), but may also be used in conjunction with any method which includes the step of selecting a color for a node in an interference graph. The method 700 of coloring a selected node may be represented by the flow diagram of FIG. 7. For our example, we select a node with name A. Next, the color of each neighbor is determined (step 710). The colors of a node's neighbors may be easily determined from a bit vector indicating available colors, e.g., bit vector 910 of FIG. 9. Each node in the interference graph has a corresponding bit vector 910 in a data structure 900. Data structure 900 suitably includes all the bit vectors 910 for all the nodes in the interference graph. While the bit vectors for each node are shown stored in a common data structure 900 (FIG. 9), the bit vector for each node could instead be dynamically derived as the information is required.

Each bit vector 910 represents the colors used by any neighbor as a zero (i.e., unavailable), and represents colors unused by neighbors as a one (i.e., available). Thus, the set of available colors for our hypothetical node A is all the colors in the bit vector 910 for node A that contain a one (step 712) (i.e., colors 1, 5, and 6 in FIG. 9). Next, we determine if all the colors are used by neighbors (step 720=NO), making no colors available for node A. If no colors are available for the node, all the bits in the bit vector 910 will be zero, as illustrated for node B in FIG. 9. If no color is available, the node may not be colored, and the color selection method 700 exits without selecting a color. In this case, the node typically will be marked for spilling and removed from the interference graph along with its incident edges. Note, however, that for the specific Chaitin implementation shown in FIGS. 6A–C, the "Color Node" step (644) is not encountered unless no nodes have been marked for spilling (step 636), assuring that a color is available for the selected node. The steps of marking the node for spilling and removing the node from the interference graph are included for cases where the spill decision is deferred until the coloring step (as is the case for the Briggs coloring method discussed above).

Next we test to see if there is more than one color available for node A (step 726). If only one color is available, that color is selected for node A (step 740). If more than one color is available (step 726), we then proceed to the portion of the flow diagram shown in FIG. 7B, which considers partner information in choosing an appropriate color. A list of partners (step 750) is created by scanning the intermediate code instruction stream and building a list such as a linked list of partners (see FIG. 13 for an example.) This partner information is then used to determine a color for the node that will decrease the number of register copy instructions, thereby decreasing the execution time of the run-time code. Conceptually, after constructing the partner list, the node's partners are examined. If one partner is colored with an available color, that color is selected. If more than one partner is colored with different available colors, one of these colors is selected according to a desired heuristic, as described in detail below. If no partners are colored, the coloring scheme then looks to the next level, meaning the partners of the node's partners (i.e., transitive partners). The same logic above applies to this new level, i.e., if one of the transitive partners at this new level is colored with an available color, that color is selected; if more than one partner is colored with an available color, one of these colors is selected using an appropriate heuristic; and if none of the transitive partners at this level are colored, the transitive partners at the next level are considered (i.e., the partners of the partners of the node's partners). For a sparsely colored graph, the color selection may go several levels deep before finding a color, but the farther down the tree in transitive partner levels one goes, the less likely it will be that all nodes in the branch of the tree connecting the two distant nodes will have the same color. As a result, with each step down in levels of partners (i.e., transitivity), the value of choosing a color at that level is reduced. As a practical matter, a register allocator in an optimizing compiler that implements the method of the present invention will stop at two or three levels deep in transitivity, since the value in choosing a color at deeper levels is offset by the penalty in compilation time which would occur by continuing down into subsequent levels.

For the specific implementation shown in the figures, the method of the present invention is implemented by providing a level variable, which is initially set to 1 (step 752). The method then determines if any partner at that level is colored with an available color (step 760). Note that when level=1, direct partners are considered, and when level>1, transitive partners are considered. If any partner at the selected level is colored with an available color (step 760=YES), one of these colors is selected for the node (step 770). If all partners at this level are uncolored (step 760=NO), we next check to see if we are at the deepest level we want to go by comparing the level variable with a predetermined threshold value (step 780). For this example, we assume the threshold value is 3. Thus, on the first pass, level=1 and threshold=3, so the level is incremented to 2 (step 784), and the colors of the transitive partners at the next level are determined (step 760). For this specific example, if the method goes down three levels in transitivity and finds no colored partners, then level=3 and threshold=3, causing the test in step 780 to return a NO response. The NO response indicates that there were no partners nor transitive partners in the first three levels that were colored, so the color of partners did not help in selecting a color, and one of the available colors is selected using an appropriate heuristic (step 782). The first level at which at least one partner is colored with an available color, the response to the test in step 760 is YES, and one of the partner colors that are also available colors is selected according to some heuristic (step 770). Several different appropriate heuristics are discussed below in reference to the flow diagram of FIG. 8.

Figure 8:
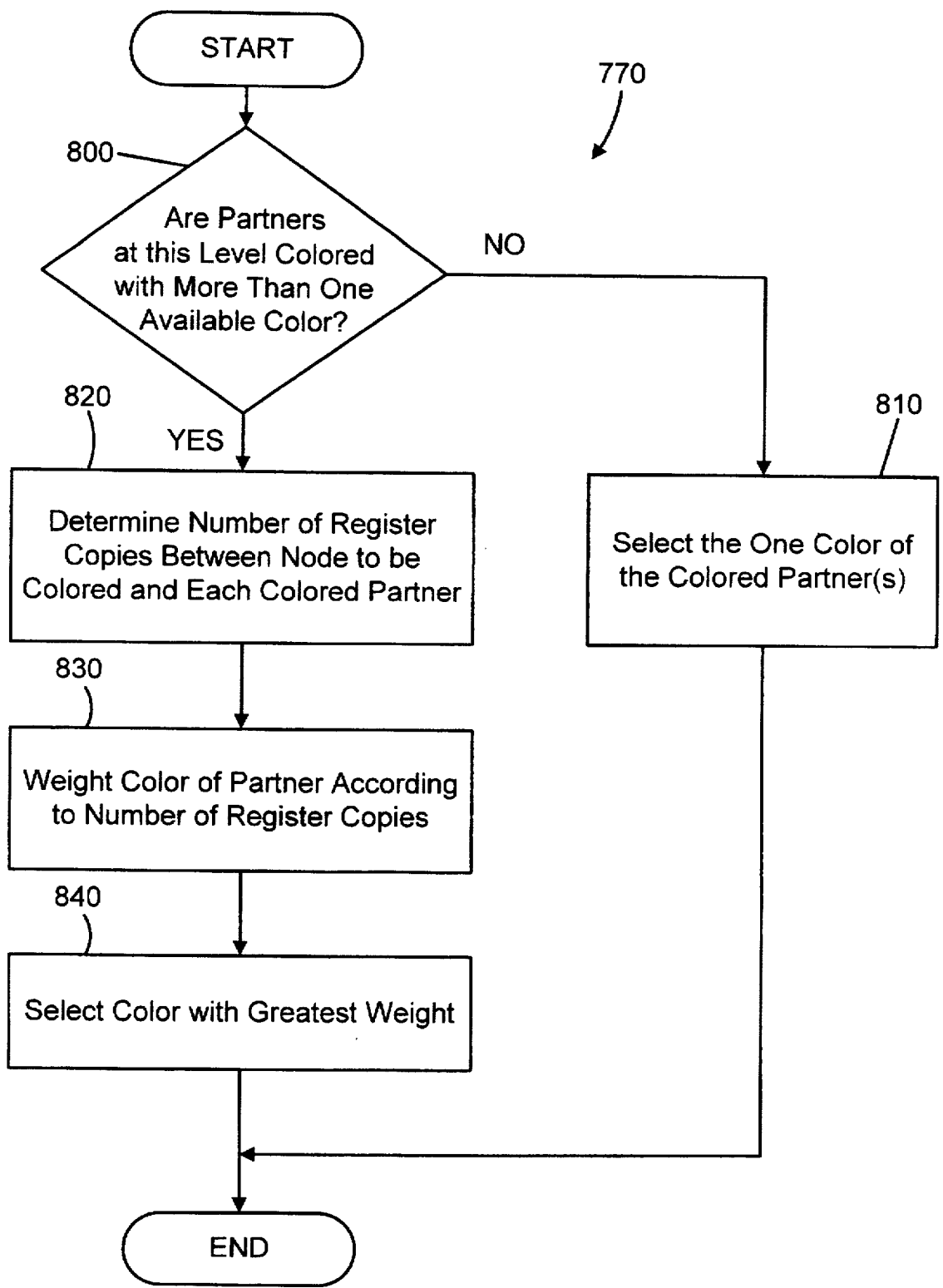
FIG. 8 is a flow diagram of a scheme for selecting between two or more partner colors that are also available colors.

One suitable implementation of choosing a color from available partner colors (step 770 in FIG. 7B) is illustrated in FIG. 8. First, we determine whether there are partners at this level that are colored with more than one available color (step 800). If only one available color is present in the partners at that level (step 800=NO), that color is selected (step 810). If more than one available color is present in partners at that level (step 800=YES), any of these colors may be selected, but judicious selection of one of these colors may further improve the register allocation method. For example, the method may be further improved by determining the number of register copies between the node to be colored and each partner that is colored with an available color (step 820). Each available color may then be weighted according to the number of register copies (step 830), and the color with the greatest weight is selected (step 840). This step of weighting (step 830) may involve a straight sum of the numbers of register copies for the partners of that color, or may be an algebraic relationship of weights depending on a number of factors. For a straight sum approach, the weight of the color is the sum of the number of register copies performed for all partners at that level that have that color. One suitable example of a more sophisticated weighting scheme weights register copies according to the loop depth of each register copy instruction. One suitable way of weighting according to loop depth would be to give a weight of one to a register copy that is not nested, a weight of ten to a register copy that is singly nested, a weight of one hundred to a register copy that is doubly nested, and so forth. The overall weighting of the color is the sum of all loop-weighted values for that color. By weighting the colors according to the loop-weighted values, a color is selected that will reduce the greatest number of nested register copy instructions, and will thus improve the execution time of the run-time code.

Figure 9:
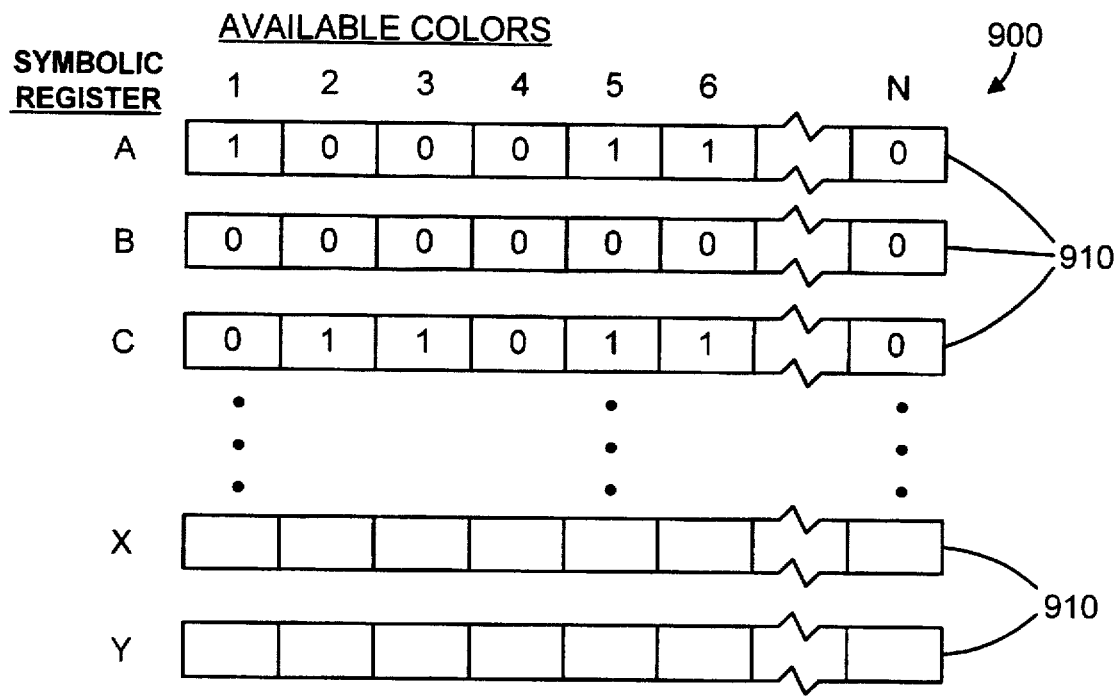
FIGS. 9–12 are schematic representations of specific implementations of various bit vectors and masks used in accordance with the apparatus and method of the present invention.

One suitable implementation of the method 700 of FIGS. 7A, 7B, and 8 is best understood by referring to FIGS. 9–14. Referring now to FIG. 9, a data structure 900 stores an array of bit vectors 910, with each bit vector indicating the colors available with a "1" and indicating the colors that are not available with a "0" (as described above). Thus, step 710 (FIG. 7A) determines the color of each neighbor by examining each neighboring node and placing a zero in the appropriate bit position of corresponding bit vector 910 for the color of each neighbor, while placing all other bits in the one state. The available colors are then determined (step 712) by examining the bit vector 910. Bit vector 910 is then used to determine whether a color is available for the node of interest (step 720). A color is not available if all bits of bit vector 910 are zero (such as shown for B), but a color is available if one or more bits of bit vector 910 are one. At the same time, more than one color is available (step 726) if more than one bit within bit vector 910 is high. If only one bit in bit vector 910 is high (step 726=NO), the node must be assigned the one available color (step 740). If more than one color is available, we may improve the execution of the run-time code if we make an intelligent choice of the available colors based on partner information.

Figure 13:
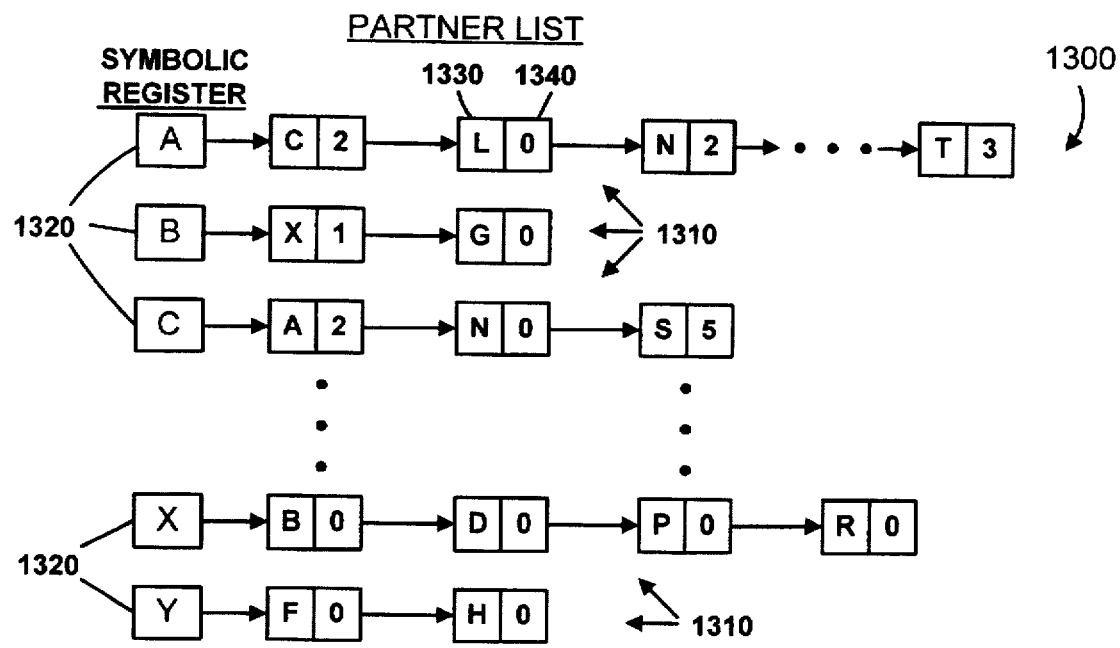
FIG. 13 is a schematic representation of a partner list in a linked list format.

To determine partner information, a list of partners is generated (step 750) by analyzing the intermediate code instruction stream and creating a list of all partners for a given symbolic register. Referring to FIG. 13, one suitable type of list is a linked list structure 1300 that contains one linked list 1310 for each symbolic register. Each linked list 1310 has a header block 1320 that contains the name (i.e., live range) for the symbolic register for which the linked list 1310 contains partner information. The linked list is built by traversing all portions of the code in any order or direction to locate all register copies to and from the symbolic register of interest. When a register copy to the symbolic register is found, the source register is added to the linked list 1310, creating a partnership. In like manner, when a register copy from the symbolic register is found, the target register is added to the linked list as well. Each entry in each linked list 1310 has two fields, a partner field 1330 which contains the name of the partner, and a color field 1340 that indicates the color of the partner. For example, the linked list 1310 with symbolic register B in the header block indicates that B's partners are symbolic registers X and G, and that X is colored with color 1 while G is uncolored (color=0). Note that if G and X are shown as partners in B's linked list, B must also appear in both G and X's list of partners. The linked list 1310 thus contains all of the partners of the corresponding symbolic register, and the linked list structure 1300 thus contains all partnership information for all symbolic registers.

Figure 10:
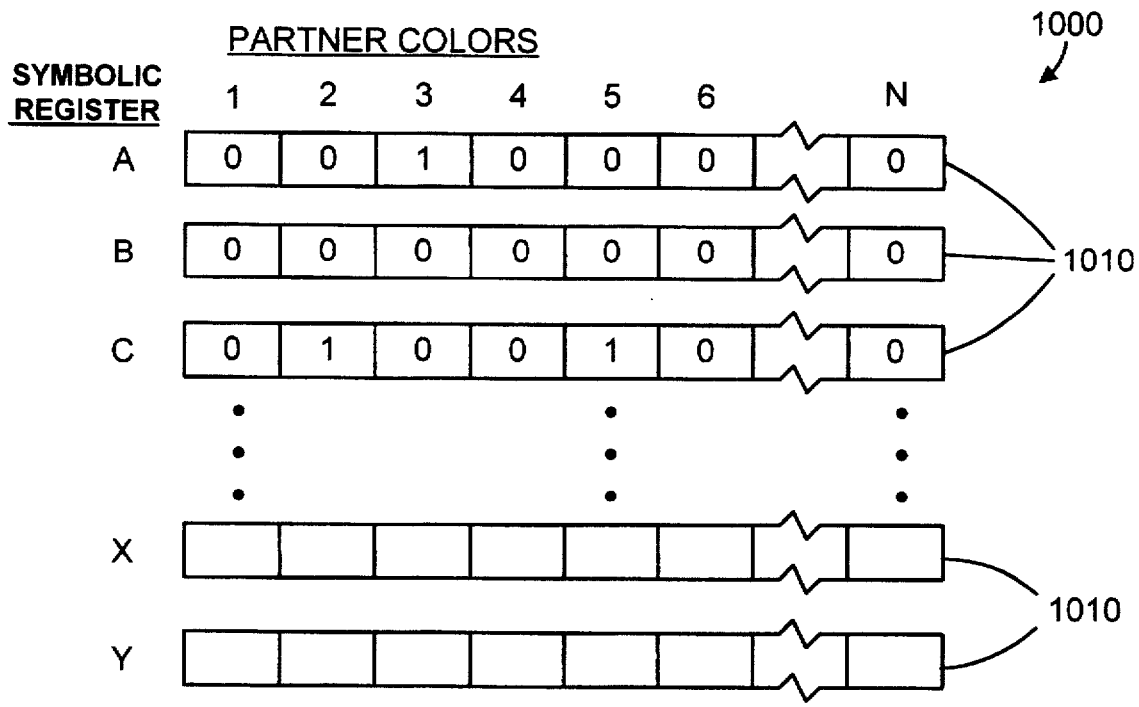

Referring now to FIG. 10, once the linked list structure 1300 (FIG. 13) is completed, the information contained therein may be used to generate a data structure 1000 that has a number of bit vectors 1010 corresponding to the symbolic registers, with each bit vector (or partner mask)

1010 indicating the colors of the symbolic register's partners. To generate bit vector 1010 for symbolic register C, for example, the partner list for C is traversed, and each color in the list is represented in the partner colors bit vector with a one. If we assume, for example, that symbolic register A is colored with color 2, symbolic register M is uncolored, and symbolic register S is colored with color 5, the partner color bit vector 1010 for symbolic register C will have a one in the 2 and 5 positions, indicating that these two colors are found in the partners of C. The partner mask 1010 for the symbolic register is then logically ANDed with the corresponding available colors bit vector 910 to produce a list of colors that are both available and in the partners. For example, if C's available colors (FIG. 9) are colors 2, 3, 5, and 6, ANDing the available color bit vector 910 with the partner mask 1010 for C yields the same data as in partner mask 1010, indicating that colors 2 and 5 are available and are colors of C's partners. If there are one or more colors that are both available and in the symbolic register's partners, one of these colors must be selected (step 770). If the result of the logical AND operation is a bit vector with all zeroes (step 760=NO), this indicates that there are no available colors that are also partner colors. Assuming the values shown in FIGS. 9 and 10, a bit vector with all zeroes would result from bit vector 910 for symbolic register A being ANDed with partner mask 1010 for symbolic register A. This means that the information relating to the node's direct partners did not help in selecting an appropriate color for the node. Assuming an appropriate level threshold is set, the current level is then compared to the threshold (step 780), and the level is incremented (step 784) if appropriate.

The second level of partners takes in information from transitive partners, since the operations are now dealing with the color of partners of the node's uncolored partners. If any of the colors are both available and used by a partner at any level, this color will be considered for coloring the node. Of course, if only one such color results, this color is selected (step 770). However, if several colors are both available and in the neighbors at the selected level, one of these colors must be selected (step 770) using an appropriate heuristic.

Notice that the level of transitive partners is only increased (step 784) if there are no partners that are colored with an available color at the current level, and if the current level is below the predetermined threshold level. If the level is increased to the threshold level, and a suitable color that is available and in a colored partner at that level is not found, the information relating to the transitive partners has proved to be of no value in the color selection for this node, and one of the available colors is selected (step 782) according to any suitable heuristic.

In contrast, when one or more colors are both available and used by one or more partners (step 760=YES), one of the colors must be selected. If only one color is both available and used in one or more partners (step 800=NO), the one color is selected for the node (step 810). On the other hand, if more than one color is both available and used in the partners (step 800=YES), a decision must be made to determine which of the colors will be selected. The method may be further refined by adding other criteria which will add yet more intelligence to the choice of color. For example, one suitable method weights the colors according to the number of register copies. First, the number of copies between the node to be colored and colored partners must be determined for each color (step 820). The colors are then weighted (step 830) according to the number of register copies for that color, and the color with the greatest weight is selected (step 840). Any suitable method for weighting the colors may be used, but two are discussed here for purposes of illustrating the weighting concept.

Figure 11:
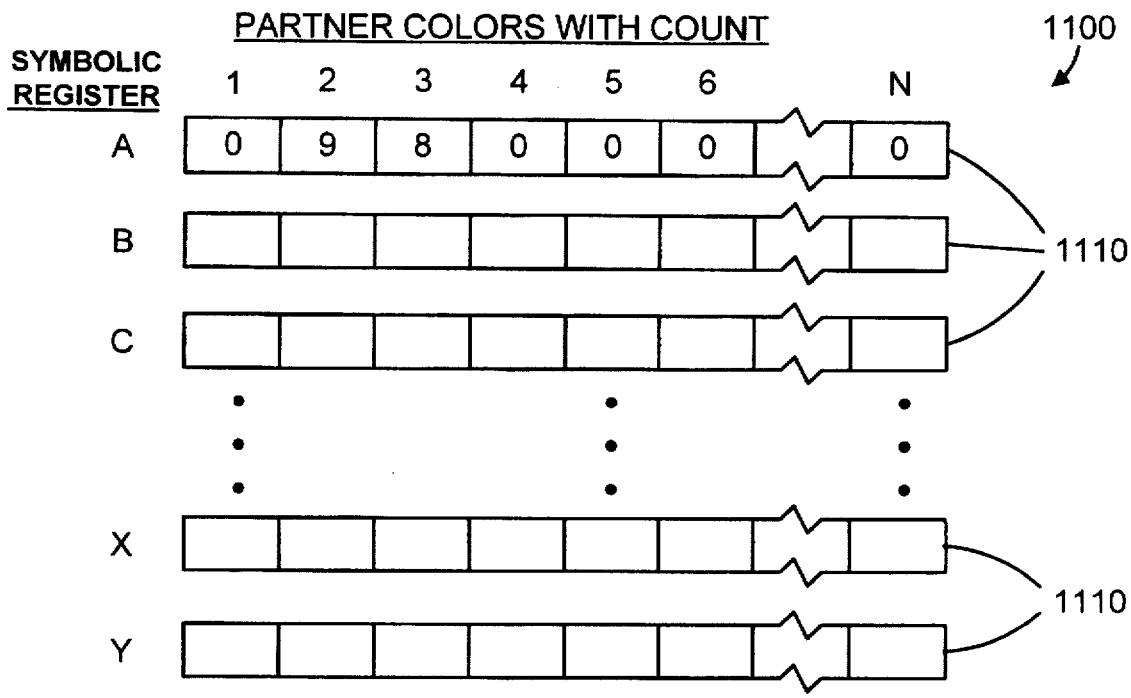
Figure 14:
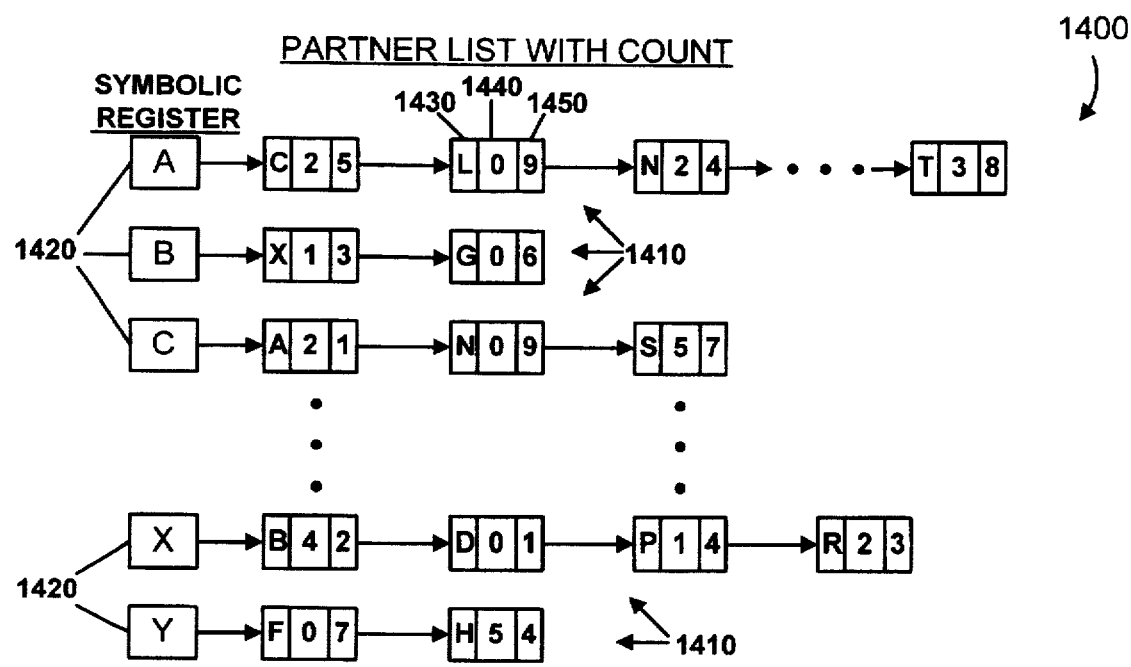
FIG. 14 is a schematic representation of a partner list in a linked list format which includes a count field for indicating the weighted number of register copies for that partner.

A simple weighting scheme would use a partner list as shown in FIG. 14, which includes not only a name field 1430 and a color field 1440, but also includes a count field 1450 in each link of each linked list 1410. The count field for the simple weighting scheme contains the number of register copies between these two partners. Referring to FIG. 11, a different data structure 1100 is required which is analogous to the data structure 1000 of FIG. 10, but instead of storing a binary one if a color is found in the partners, an integer count of the weight is stored instead in a vector 1110 to reflect the relative weight of that color. To fill in the data in vector 1110 corresponding to symbolic register A, we begin at the corresponding linked list 1410 in FIG. 14 for symbolic register A. We see from the name fields 1430 of each link that A has partners C, L, N, and T (and possibly others not shown). We see from the color fields 1440 of each link that C is colored with color 2, L is not colored, N is colored with color 2, and T is colored with color 3. We also know from count fields 1450 that A and C have 5 register copies between them, that A and L have 9 register copies between them, that A and N have 4 register copies between them, and that A and T have 8 register copies between them. For the simple weighting scheme, the weighted value of each color is determined by traversing the list and adding the value of the count field to the value of all other count fields that have the same color. Thus, for the partner list with count for symbolic register A (FIG. 14), the corresponding weighted count is shown in FIG. 11 as vector 1110 for symbolic register A, with color 2 having a value of 9 (5 from C and 4 from N), and color 3 having a value of 8 (from T). Under the simple weighting scheme, color 2 would be selected (step 840) since it has the greatest weight.

A second suitable weighting scheme uses loop depth to appropriately weight the colors. An example of weighting according to loop depth follows: for register copies that are not nested, they are assigned a weighted value of 1. Register copies that are singly nested are assigned a weighted value of 10. Register copies that are doubly nested are assigned a weighted value of 100, and so on. The weighted values for each color are then summed, and placed in a vector 1110 corresponding to the appropriate symbolic register. The color with the greatest weighted value is then selected. Note that the two weighting schemes disclosed herein are described to illustrate two possible weighting schemes that may be used in conjunction with the method of the present invention. Other weighting schemes not specifically disclosed herein are anticipated, and are clearly within the scope of the present invention.

Figure 12:
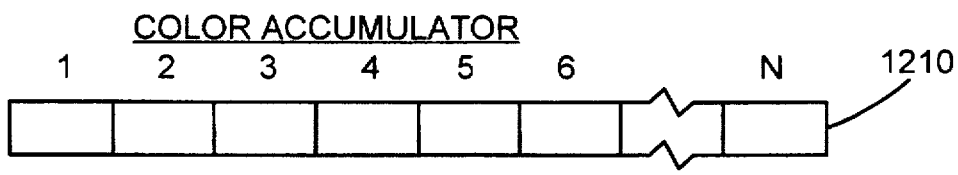

While the data structures 1000 of FIG. 10 and 1100 of FIG. 11 are shown for the purposes of illustrating the present invention, implementing such a data structure in a computer's memory is very inefficient due to the sparse nature of the information contained within the data structure. Referring to FIG. 12, a more efficient method of determining the required color information uses a color accumulator 1210. Color accumulator 1210 may have a binary structure identical to a single vector entry 1010 in data structure 1000 or may have an integer structure identical to a single bit vector entry 1100 of FIG. 11, or may have other suitable configurations. Rather than storing the information for all symbolic registers at once, the color accumulator is used to hold the color values as they are computed on the fly for any one of the symbolic registers. Since the method of the present invention is performed on one node at a time, color accumulator 1210 may be used to accumulate the appropriate partner colors and/or count values, as appropriate, for the node of interest. Reducing the static data structures saves a great deal of memory space in the compiler. In addition, the information in linked lists 1310 of FIG. 13 and 1410 of FIG. 14 may also be dynamically derived as needed for each node at the time of coloring the node. In the alternative, other forms of the data structures 1300 and 1400, such as linked lists without integral color information, may also be used since the color of the node may be derived from the interference graph. The specific format and content of the various bit vectors, bit masks, and list structures shown in FIGS. 9-14 are shown for illustrating the general concepts of the disclosed invention, and should not be construed as limiting.

An enhancement to any of the methods discussed above within the scope of the present invention uses partner information to improve the likelihood that partnerships will be completed in the case where no colored partners or transitive partners exist at the time a color must be selected. Specifically, this enhancement will help to complete partnerships involving paired registers. A register pair comprises two symbolic registers that must receive either even-aligned or odd-aligned adjacent physical register assignments. In a system where a register pair must be even-aligned, the first of the two registers must receive an even-numbered physical register assignment. For example, two registers that require an even-aligned pair could be assigned physical registers (4,5), but not (5,6) or (4,7). When selecting a color for a partner of one of the paired registers, we would like to restrict the color selection, where possible, to avoid selecting a color that would conflict with the alignment restrictions of the uncolored partners which are elements of register pairs. Thus, when selecting the color for a node which has an uncolored partner that must be assigned an even physical register, the colors of the odd physical registers should be avoided. Note that this operation specifies a preference, not a restriction, to the unpaired partners color selection. If taking partners' alignment restrictions into account would eliminate all available colors, the preference would be ignored. This enhancement may be used to select one of the available colors (step 782 in FIG. 7B), or may be used to discriminate between available partner colors (step 770 in FIG. 7B).

The methods and apparatus of the present invention in accordance with the preferred embodiments disclosed herein, when used in an optimizing compiler, reduce the execution time of run-time code by eliminating redundant register copy instructions by more intelligently selecting a color for a node based on one or more heuristics that will tend to color partners the same color, where possible, in the interference graph.

While the invention has been particularly shown and described with reference to preferred exemplary embodiments thereof, it will be understood by those skilled in the art that various changes in form and details may be made therein without departing from the spirit and scope of the invention.

We claim:

1. A computer apparatus comprising:
    a central processing unit having a plurality of registers, the central processing unit executing a first instruction stream and in response to the first instruction stream, the central processing operating on information stored in the plurality of registers;
    a compiler for generating the first instruction stream from a second instruction stream, the second instruction stream having a plurality of variables, the compiler including:
        a live range calculator for determining a plurality of live ranges for the plurality of variables;
        a register allocator, the register allocator being adapted to assign the plurality of registers within the central processing unit to the plurality of live ranges by building and coloring an interference graph with a plurality of nodes and a plurality of edges, each node of the interference graph representing one of the plurality of live ranges, two of the plurality of nodes being neighbors if the two nodes are connected with an edge, two of the plurality of nodes being direct partners if an instruction within the second instruction stream copies the variable corresponding to one of the two nodes to the variable corresponding to the other of the two nodes, the register allocator being adapted to select a color for each node in the interference graph according to the colors, if any, assigned to one of the plurality of nodes that are direct partners of the node to be colored, the colors of the direct partners being weighted according to at least one predetermined criterion.

2. The computer apparatus of claim 1 wherein the first instruction stream comprises a machine code instruction stream, wherein the second instruction stream comprises an intermediate language instruction stream, and wherein the plurality of variables comprise a plurality of symbolic registers within the intermediate language instruction stream.

3. The computer apparatus of claim 1 wherein the register allocator is adapted to select the color having a weight that has a predetermined numerical relationship to the weights of the other colors of the direct partners.

4. The computer apparatus of claim 1 wherein the register allocator is adapted to detect when no direct partners are colored, and to select a color, if any, assigned to at least one of the plurality of nodes that are transitive partners of the node to be colored, two nodes being transitive partners if there exists a partnership link between each of the two nodes and a common node.

5. The computer apparatus of claim 4 wherein the colors of the transitive partners are weighted according to at least one predetermined criterion, and wherein the register allocator is adapted to select the color having a weight that has a predetermined numerical relationship to the weights of the other colors of the transitive partners.

6. A computer apparatus for generating a first instruction stream executable on a central processing unit from a second instruction stream, the second instruction stream having a plurality of variables, the computer apparatus comprising:
    a live range calculator for determining a plurality of live ranges for the plurality of variables; and
    a register allocator, the register allocator being adapted to assign the plurality of registers within the central processing unit to the plurality of live ranges by building and coloring an interference graph with a plurality of nodes and a plurality of edges, each node of the interference graph representing one of the plurality of live ranges, two of the plurality of nodes being neighbors if the two nodes are connected with an edge, two of the plurality of nodes being direct partners if an instruction within the second instruction stream copies the variable corresponding to one of the two nodes to the variable corresponding to the other of the two nodes, the register allocator being adapted to select a color for each node in the interference graph according to the colors, if any, assigned to one of the plurality of nodes that are direct partners of the node to be colored, the colors of the direct partners being weighted according to at least one predetermined criterion.

7. The computer apparatus of claim 6 wherein the register allocator is adapted to select the color having a weight that has a predetermined numerical relationship to the weights of the other colors.

8. The computer apparatus of claim 6 wherein the register allocator is adapted to detect when no direct partners are colored, and to select a color, if any, assigned to at least one of the plurality of nodes that are transitive partners of the node to be colored, two nodes being transitive partners if there exists a partnership link between each of the two nodes and a common node.

9. The computer apparatus of claim 8 wherein the colors of the transitive partners are weighted according to at least one predetermined criterion, and wherein the register allocator is adapted to select the color having a weight that has a predetermined numerical relationship to the weights of the other colors of the transitive partners.

10. A program product comprising:
   a recordable media; and
   a compiler recorded on the recordable media, the compiler being used to generate a first instruction stream executable on a central processing unit in a computer apparatus from a second instruction stream, the second instruction stream having a plurality of variables, the compiler including:
      a live range calculator for determining a plurality of live ranges for the plurality of variables; and
      a register allocator, the register allocator being adapted to assign the plurality of registers within the central processing unit to the plurality of live ranges by building and coloring an interference graph with a plurality of nodes and a plurality of edges, each node of the interference graph representing one of the plurality of live ranges, two of the plurality of nodes being neighbors if the two nodes are connected with an edge, two of the plurality of nodes being direct partners if an instruction within the second instruction stream copies the variable corresponding to one of the two nodes to the variable corresponding to the other of the two nodes, the register allocator being adapted to select a color for each node in the interference graph according to the colors, if any, assigned to one of the plurality of nodes that are direct partners of the node to be colored, the colors of the direct partners being weighted according to at least one predetermined criterion.

11. The program product of claim 10 wherein the register allocator is adapted to select the color having a weight that has a predetermined numerical relationship to the weights of the other colors.

12. The program product of claim 10 wherein the register allocator is adapted to detect when no direct partners are colored, and to select a color, if any, assigned to at least one of the plurality of nodes that are transitive partners of the node to be colored, two nodes being transitive partners if there exists a partnership link between each of the two nodes and a common node.

13. The program product of claim 12 wherein the colors of the transitive partners are weighted according to at least one predetermined criterion, and wherein the register allocator is adapted to select the color having a weight that has a predetermined numerical relationship to the weights of the other colors of the transitive partners.

14. A method for allocating a plurality of registers to a plurality of variables in an instruction stream by coloring an interference graph with a number of colors not to exceed the number of the plurality of resources, comprising the steps of:
   placing a plurality of nodes into the interference graph, each node corresponding to at least one of the plurality of items;
   placing a plurality of edges into the interference graph interconnecting the plurality of nodes, each edge having two ends and representing an interference between the two nodes coupled to the two ends, two of the plurality of nodes being neighbors if the two nodes are connected by an edge;
   selecting one of the plurality of nodes for coloring;
   determining the direct partners for the selected node, two of the plurality of nodes being direct partners if an instruction within the instruction stream copies the variable corresponding to one of the two nodes to the variable corresponding to the other of the two nodes;
   determining the colors of the direct partners of the selected node;
   weighting the color, if any, of each of the direct partners according to at least one predetermined criterion; and
   selecting a color for the selected node by selecting a color, if any, assigned to one of the direct partners of the node to be colored according to the weights of the colors of the direct partners.

15. The method of claim 14 wherein the step of selecting a color for the selected node comprises the steps of:
   determining the colors of the neighbors of the selected node;
   designating the colors not used by the neighbors of the selected node as available colors;
   wherein the step of selecting a color for the selected node includes the steps of:
      selecting a color, if any, assigned to one of the direct partners of the selected node that is one of the available colors; and
      if no direct partners are colored with one of the available colors, selecting one of the available colors.

16. The method of claim 14 wherein the step of weighting the color of each of the direct partners comprises the steps of:
   counting the number of instructions in the instruction stream that perform copies between the selected node and one of its direct partners; and
   assigning to the color of the direct partners a weighted value that is a function of the count.

17. The method of claim 16 wherein the step of weighting the color of each of the direct partners includes performing a mathematical operation, for each color, on the weighted values for all direct partners that are colored with the same color, and wherein the step of selecting a color for the selected node includes selecting the color that has a weighted value with a predetermined numerical relationship to the weighted values for the other colors.

18. The method of claim 14 further comprising the steps of:
   detecting when no direct partners of the selected node are colored; and
   selecting a color, if any, assigned to one of the plurality of nodes that are transitive partners of the selected node, two nodes being transitive partners if there exists a partnership link between each of the two nodes and a common node.

19. The method of claim 18 further comprising the steps of:

weighting the colors of the transitive partners according to at least one predetermined criterion;

selecting the color with a weight having a predetermined numerical relationship to the weights of the other colors of the transitive partners.

20. The method of claim 14 wherein the step of selecting a color for the selected node avoids selecting a color that would conflict with the alignment restrictions of uncolored partners which are elements of register pairs when avoiding the color leaves other available colors which may be selected instead.

21. The method of claim 14 further comprising the step of assigning each color to a unique one of the plurality of registers within the central processing unit, each variable of a given color accessing the register within the central processing unit corresponding to the color.

22. A computer implemented method for allocating a plurality of registers within a central processing unit to a plurality of variables within an instruction stream, comprising the steps of:

determining a plurality of live ranges for the plurality of variables;

building and coloring an interference graph with a plurality of nodes and a plurality of edges, each live range corresponding to one of the plurality of nodes in the interference graph, the edges of the interference graph representing interferences between nodes, two of the plurality of nodes being neighbors if the two nodes are connected by an edge, two of the plurality of nodes being direct partners if an instruction within the instruction stream copies the variable corresponding to one of the two nodes to the variable corresponding to the other of the two nodes;

coloring the interference graph with a number of colors not to exceed the number of the plurality of registers within the central processing unit, the coloring step including the steps of:

selecting one of the plurality of nodes for coloring;

determining the colors of the direct partners of the selected node;

weighting the color, if any, of each of the direct partners of the selected node according to at least one predetermined criterion; and selecting a color for the selected node by selecting a color, if any, assigned to one of the direct partners of the node to be colored according to the weights of the colors of the direct partners.

23. The computer implemented method of claim 22 wherein the step of selecting a color for the selected node comprises the steps of:

determining the colors of the neighbors of the selected node;

designating the colors not used by the neighbors of the selected node as available colors; and wherein the step of selecting a color for the selected node includes the steps of:

selecting a color, if any, assigned to one of the direct partners of the selected node that is one of the available colors; and if no direct partners are colored with one of the available colors, selecting one of the available colors.

24. The computer implemented method of claim 22 wherein the step of weighting the color of each of the direct partners comprises the steps of:

counting the number of instructions in the instruction stream that perform copies between the selected node and one of its direct partners; and assigning to the color of the direct partners a weighted value that is a function of the count.

25. The computer implemented method of claim 22 wherein the step of weighting the color of each of the direct partners includes performing a mathematical operation, for each color, on the weighted values for all direct partners that are colored with the same color, and wherein the step of selecting a color for the selected node includes selecting the color that has a weighted value with a predetermined numerical relationship to the weighted values for the other colors.

26. The computer implemented method of claim 22 further comprising the steps of:

detecting when no direct partners of the selected node are colored; and selecting a color, if any, assigned to one of the plurality of nodes that are transitive partners of the selected node, two nodes being transitive partners if there exists a partnership link between each of the two nodes and a common node.

27. The computer implemented method of claim 26 further comprising the steps of:

weighting the colors of the transitive partners according to at least one predetermined criterion;

selecting the color with a weight having a predetermined numerical relationship to the weights of the other colors of the transitive partners.

28. The computer implemented method of claim 22 wherein the step of selecting a color for the selected node avoids selecting a color that would conflict with the alignment restrictions of uncolored partners which are elements of register pairs when avoiding the color leaves other available colors which may be selected instead.

29. The computer implemented method of claim 22 further comprising the step of assigning each color to a unique one of the plurality of registers within the central processing unit, each variable of a given color accessing the register within the central processing unit corresponding to the color.

30. A method for distributing a program product comprising the steps of:

initiating a connection between a first computer system and a second computer system;

transmitting the program product from the first computer system to the second computer system, the program product being a compiler, the compiler being used to generate a first instruction stream executable by a central processing unit in a computer apparatus from a second instruction stream, the second instruction stream including a plurality of variables, the compiler including a live range calculator for determining a plurality of live ranges for the plurality of variables, and the compiler further including a register allocator, the register allocator being adapted to assign the plurality of registers within the central processing unit to the plurality of live ranges by building and coloring an interference graph with a plurality of nodes and a plurality of edges, each node of the interference graph representing one of the plurality of live ranges, two of the plurality of nodes being neighbors if the two nodes are connected with an edge, two of the plurality of nodes being direct partners if an instruction within the second instruction stream copies the variable corresponding to one of the two nodes to the variable corresponding to the other of the two nodes, the register allocator being adapted to select a color for each node in the interference graph according to the colors, if any, assigned to one of the plurality of nodes that are direct partners of the node to be colored, the colors of the direct partners being weighted according to at least one predetermined criterion.

31. A computer apparatus comprising:

a central processing unit having a plurality of registers, the central processing unit executing a first instruction stream and in response to the first instruction stream, the central processing operating on information stored in the plurality of registers;

a compiler for generating the first instruction stream from a second instruction stream, the second instruction stream having a plurality of variables, the compiler including:

a live range calculator for determining a plurality of live ranges for the plurality of variables;

a register allocator, the register allocator being adapted to assign the plurality of registers within the central processing unit to the plurality of live ranges by building and coloring an interference graph with a plurality of nodes and a plurality of edges, each node of the interference graph representing one of the plurality of live ranges, two of the plurality of nodes being neighbors if the two nodes are connected with an edge, two of the plurality of nodes being direct partners if an instruction within the second instruction stream copies the variable corresponding to one of the two nodes to the variable corresponding to the other of the two nodes, two of the plurality of nodes being transitive partners if there exists a partnership link between each of the two partners and a common node, the register allocator being adapted to select a color for each node in the interference graph according to the colors, if any, assigned to one of the plurality of nodes that are direct partners of the node to be colored, the register allocator being adapted to detect when no direct partners are colored, and to select a color, if any, assigned to at least one of the plurality of nodes that are transitive partners of the node to be colored.

32. The computer apparatus of claim 31 wherein the first instruction stream comprises a machine code instruction stream, where in the second instruction stream comprises an intermediate language instruction stream, and wherein the plurality of variables comprise a plurality of symbolic registers within the intermediate language instruction stream.

33. The computer apparatus of claim 31 wherein the colors of the direct partners are weighted according to at least one predetermined criterion, and wherein the register allocator is adapted to select the color having a weight that has a predetermined numerical relationship to the weights of the other colors.

34. The computer apparatus of claim 31 wherein the colors of the transitive partners are weighted according to at least one predetermined criterion, and wherein the register allocator is adapted to select the color having a weight that has a predetermined numerical relationship to the weights of the other colors.

35. A computer apparatus for generating a first instruction stream executable on a central processing unit from a second instruction stream, the second instruction stream having a plurality of variables, the computer apparatus comprising:

a live range calculator for determining a plurality of live ranges for the plurality of variables; and a register allocator, the register allocator being adapted to assign the plurality of registers within the central processing unit to the plurality of live ranges by building and coloring an interference graph with a plurality of nodes and a plurality of edges, each node of the interference graph representing one of the plurality of live ranges, two of the plurality of nodes being neighbors if the two nodes are connected with an edge, two of the plurality of nodes being direct partners if an instruction within the second instruction stream copies the variable corresponding to one of the two nodes to the variable corresponding to the other of the two nodes, two of the plurality of nodes being transitive partners if there exists a partnership link between each of the two partners and a common node, the register allocator being adapted to select a color for each node in the interference graph according to the colors, if any, assigned to one of the plurality of nodes that are direct partners of the node to be colored, the register allocator being adapted to detect when no direct partners are colored, and to select a color, if any, assigned to at least one of the plurality of nodes that are transitive partners of the node to be colored.

36. The computer apparatus of claim 35 wherein the colors of the direct partners are weighted according to at least one predetermined criterion, and wherein the register allocator is adapted to select the color having a weight that has a predetermined numerical relationship to the weights of the other colors.

37. The computer apparatus of claim 35 wherein the colors of the transitive partners are weighted according to at least one predetermined criterion, and wherein the register allocator is adapted to select the color having a weight that has a predetermined numerical relationship to the weights of the other colors.

38. A program product comprising:

a recordable media; and compiler recorded on the recordable media, the compiler being used to generate a first instruction stream executable on a central processing unit in a computer apparatus from a second instruction stream, the second instruction stream having a plurality of variables, the compiler including:

a live range calculator for determining a plurality of live ranges for the plurality of variables; and a register allocator, the register allocator being adapted to assign the plurality of registers within the central processing unit to the plurality of live ranges by building and coloring an interference graph with a plurality of nodes and a plurality of edges, each node of the interference graph representing one of the plurality of live ranges, two of the plurality of nodes being neighbors if the two nodes are connected with an edge, two of the plurality of nodes being direct partners if an instruction within the second instruction stream copies the variable corresponding to one of the two nodes to the variable corresponding to the other of the two nodes, two of the plurality of nodes being transitive partners if there exists a partnership link between each of the two partners and a common node, the register allocator being adapted to select a color for each node in the interference graph according to the colors, if any, assigned to one of the plurality of nodes that are direct partners of the node to be colored, the register allocator being adapted to detect when no direct partners are colored, and to select a color, if any, assigned to at least one of the plurality of nodes that are transitive partners of the node to be colored.

39. The program product of claim 38 wherein the colors of the direct partners are weighted according to at least one predetermined criterion, and wherein the register allocator is adapted to select the color having a weight that has a predetermined numerical relationship to the weights of the other colors.

40. The program product of claim 38 wherein the colors of the transitive partners are weighted according to at least one predetermined criterion, and wherein the register allocator is adapted to select the color having a weight that has a predetermined numerical relationship to the weights of the other colors.

41. A method for allocating a plurality of registers to a plurality of variables in an instruction stream by coloring an interference graph with a number of colors not to exceed the number of the plurality of resources, comprising the steps of:

placing a plurality of nodes into the interference graph, each node corresponding to at least one of the plurality of items;

placing a plurality of edges into the interference graph interconnecting the plurality of nodes, each edge having two ends and representing an interference between the two nodes coupled to the two ends, two of the plurality of nodes being neighbors if the two nodes are connected by an edge;

selecting one of the plurality of nodes for coloring;

determining the direct partners for the selected node, two of the plurality of nodes being direct partners if an instruction within the instruction stream copies the variable corresponding to one of the two nodes to the variable corresponding to the other of the two nodes;

determining the colors of the direct partners of the selected node; and selecting a color for the selected node by selecting a color, if any, assigned to one of the direct partners of the selected node;

detecting if no direct partners of the selected node are colored; and if no direct partners of the selected node are colored, performing the additional steps of:
  determining the colors of the transitive partners; and
  selecting a color for the selected node by selecting a color, if any, assigned to at least one of the plurality of nodes that are transitive partners of the selected node.

42. The method of claim 41 wherein the step of selecting a color for the selected node comprises the steps of:

determining the colors of the neighbors of the selected node;

designating the colors not used by the neighbors of the selected node as available colors;

wherein the step of selecting a color for the selected node includes the steps of:

selecting a color, if any, assigned to one of the direct partners of the selected node that is one of the available colors; and if no direct partners are colored with one of the available colors, selecting one of the available colors.

43. The method of claim 41 further including the step of weighting the color of each of the direct partners, the weighting comprising the steps of:

counting the number of instructions in the instruction stream that perform copies between the selected node and one of its direct partners; and assigning to the color of the direct partners a weighted value that is a function of the count.

44. The method of claim 43 wherein the step of weighting the color of each of the direct partners includes performing a mathematical operation, for each color, on the weighted values for all direct partners that are colored with the same color, and wherein the step of selecting a color for the selected node includes selecting the color that has a weighted value with a predetermined numerical relationship to the weighted values for the other colors.

45. The method of claim 41 further including the step of weighting the color of each of the transitive partners, the weighting comprising the steps of:

counting the number of instructions that perform copies between the transitive partners; and assigning a weighted value according to the number of instructions that perform copies between the transitive partners.

46. The method of claim 45 wherein the step of weighting the color of each of the transitive partners includes performing a mathematical operation, for each color, on the weighted values for all transitive partners that are colored with the same color, and wherein the step of selecting a color for the selected node includes selecting the color that has a weighted value with a predetermined numerical relationship to the weighted values for the other colors.

47. The method of claim 41, wherein, if no direct partners of the selected node are colored, the method further comprises the steps of:

determining the colors of the neighbors of the selected node;

designating the colors not used by the neighbors of the selected node as available colors;

assigning a weighted color value to each of the transitive partners of the selected node according to at least one predetermined criterion;

performing a mathematical operation on the weighted color values to arrive at a total weighted value for each color; and selecting a color of one of the transitive partners of the selected node that is designated as an available color and that has a predetermined numerical relationship to the weighted values for the other colors.

48. The method of claim 41 wherein the step of selecting a color for the selected node avoids selecting a color that would conflict with the alignment restrictions of uncolored partners which are elements of register pairs when avoiding the color leaves other available colors which may be selected instead.

49. The method of claim 41 further comprising the step of assigning each color to a unique one of the plurality of registers within the central processing unit, each variable of a given color accessing the register within the central processing unit corresponding to the color.

50. A computer implemented method for allocating a plurality of registers within a central processing unit to a plurality of variables within an instruction stream, comprising the steps of:

determining a plurality of live ranges for the plurality of variables;

building and coloring an interference graph with a plurality of nodes and a plurality of edges, each live range corresponding to one of the plurality of nodes in the interference graph, the edges of the interference graph representing interferences between nodes, two of the plurality of nodes being neighbors if the two nodes are connected by an edge, two of the plurality of nodes being direct partners if an instruction within the instruction stream copies the variable corresponding to one of the two nodes to the variable corresponding to the other of the two nodes;

coloring the interference graph with a number of colors not to exceed the number of the plurality of registers within the central processing unit, the coloring step including the steps of:

selecting one of the plurality of nodes for coloring;

determining the colors of the direct partners of the selected node; and selecting a color for the selected node by selecting a color, if any, assigned to one of the direct partners of the selected node;

detecting if no direct partners of the selected node are colored; and if no direct partners of the selected node are colored, performing the additional steps of:

determining the colors of the transitive partners; and selecting a color for the selected node by selecting a color, if any, assigned to at least one of the plurality of nodes that are transitive partners of the selected node.

51. The computer implemented method of claim 50 wherein the step of selecting a color for the selected node comprises the steps of:

determining the colors of the neighbors of the selected node;

designating the colors not used by the neighbors of the selected node as available colors; and wherein the step of selecting a color for the selected node includes the steps of:

selecting a color, if any, assigned to one of the direct partners of the selected node that is one of the available colors; and if no direct partners are colored with one of the available colors, selecting one of the available colors.

52. The computer implemented method of claim 50 further including the step of weighting the color of each of the direct partners said weighting comprising the steps of:

counting the number of instructions in the instruction stream that perform copies between the selected node and one of its direct partners; and assigning to the color of the direct partners a weighted value that is a function of the count.

53. The computer implemented method of claim 52 wherein the step of weighting the color of each of the direct partners includes performing a mathematical operation, for each color, on the weighted values for all direct partners that are colored with the same color, and wherein the step of selecting a color for the selected node includes selecting the color that has a weighted value with a predetermined numerical relationship to the weighted values for the other colors.

54. The computer implemented method of claim 50 further including the step of weighting the color of each of the transitive partners, the weighting comprising the steps of:

counting the number of instructions in the instruction stream that perform copies between the selected node and one of its transitive partners; and assigning to the color of the direct partners a weighted value that is a function of the count.

55. The computer implemented method of claim 54 wherein the step of weighting the color of each of the transitive partners includes performing a mathematical operation, for each color, on the weighted values for all transitive partners that are colored with the same color, and wherein the step of selecting a color for the selected node includes selecting the color that has a weighted value with a predetermined numerical relationship to the weighted values for the other colors.

56. The computer implemented method of claim 50, wherein, if no direct partners of the selected node are colored, the method further comprises the steps of:

determining the colors of the neighbors of the selected node;

designating the colors not used by the neighbors of the selected node as available colors;

assigning a weighted color value to each of the transitive partners of the selected node according to at least one predetermined criterion;

performing a mathematical operation on the weighted color values to arrive at a total weighted value for each color; and selecting a color of one of the transitive partners of the selected node that is designated as an available color and that has a predetermined numerical relationship to the weighted values for the other colors.

57. The computer implemented method of claim 50, wherein the step of selecting a color for the selected node avoids selecting a color that would conflict with the alignment restrictions of uncolored partners which are elements of register pairs when avoiding the color leaves other available colors which may be selected instead.

58. The computer implemented method of claim 50 further comprising the step of assigning each color to a unique one of the plurality of registers within the central processing unit, each variable of a given color accessing the register within the central processing unit corresponding to the color.

59. A method for distributing a program product comprising the steps of:

initiating a connection between a first computer system and a second computer system;

transmitting the program product from the first computer system to the second computer system, the program product being a compiler, the compiler being used to generate a first instruction stream executable by a central processing unit in a computer apparatus from a second instruction stream, the second instruction stream including a plurality of variables, the compiler including a live range calculator for determining a plurality of live ranges for the plurality of variables, and the compiler further including a register allocator, the register allocator being adapted to assign the plurality of registers within the central processing unit to the plurality of live ranges by building and coloring an interference graph with a plurality of nodes and a plurality of edges, each node of the interference graph representing one of the plurality of live ranges, two of the plurality of nodes being neighbors if the two nodes are connected with an edge, two of the plurality of nodes being neighbors if the two nodes are connected with an edge, two of the plurality of nodes being direct partners if an instruction within the second instruction stream copies the variable corresponding to one of the two nodes to the variable corresponding to the other of the two nodes, two of the plurality of nodes being transitive partners if there exists a partnership link between each of the two partners and a common node, the register allocator being adapted to select a color for each node in the interference graph according to the colors, if any, assigned to one of the plurality of nodes that are direct partners of the node to be colored, the register allocator being adapted to detect when no direct partners are colored, and to select a color, if any, assigned to at least one of the plurality of nodes that are transitive partners of the node to be colored.

* * * * *

UNITED STATES PATENT AND TRADEMARK OFFICE
CERTIFICATE OF CORRECTION

PATENT NO. : 5,784,066
DATED : July 21, 1998
INVENTOR(S) : Aizikowitz, et al

It is certified that error appears in the above-identified patent and that said Letters Patent is hereby corrected as shown below:

Col. 23, Line 43, "where in" should be --wherein--.

Col. 24, Line 36, before "compiler" (first occurrence) insert --a--.

Signed and Sealed this

Twenty-ninth Day of December, 1998

Attest:

BRUCE LEHMAN

*Attesting Officer*   *Commissioner of Patents and Trademarks*